United States Patent
Larson et al.

(10) Patent No.: US 8,069,188 B2
(45) Date of Patent: Nov. 29, 2011

(54) DATABASE SYSTEM STORING A DATA STRUCTURE THAT INCLUDES DATA NODES CONNECTED BY CONTEXT NODES AND RELATED METHOD

(75) Inventors: Jonathan K. Larson, Silverdale, WA (US); Bryan B. Tower, Silverdale, WA (US)

(73) Assignee: Applied Technical Systems, Inc., Silverdale, WA (US)

( * ) Notice: Subject to any disclaimer, the term of this patent is extended or adjusted under 35 U.S.C. 154(b) by 657 days.

(21) Appl. No.: 12/115,228

(22) Filed: May 5, 2008

(65) Prior Publication Data

US 2008/0281801 A1 Nov. 13, 2008

Related U.S. Application Data

(60) Provisional application No. 60/916,500, filed on May 7, 2007.

(51) Int. Cl.
*G06F 17/30* (2006.01)

(52) U.S. Cl. ........ 707/802; 707/803; 707/741; 707/756; 707/769; 707/791; 707/793; 707/795; 707/796

(58) Field of Classification Search .......... 707/741, 707/756, 769, 791, 793, 795–796, 802–803; 709/250; 706/47; 704/9; 349/113; 715/523
See application file for complete search history.

(56) References Cited

U.S. PATENT DOCUMENTS

| | | | |
|---|---|---|---|
| 5,970,490 A * | 10/1999 | Morgenstern | 1/1 |
| 7,152,205 B2 * | 12/2006 | Day et al. | 715/239 |
| 7,483,901 B1 * | 1/2009 | Massoudi et al. | 1/1 |
| 7,596,573 B2 * | 9/2009 | O'Neil et al. | 1/1 |
| 7,698,343 B2 * | 4/2010 | Anderson et al. | 707/756 |
| 2001/0030724 A1 * | 10/2001 | Umemoto et al. | 349/113 |
| 2002/0099738 A1 * | 7/2002 | Grant | 707/513 |
| 2004/0268249 A1 * | 12/2004 | Fennelly et al. | 715/523 |
| 2005/0086584 A1 * | 4/2005 | Sampathkumar et al. | 715/501.1 |
| 2005/0198400 A1 * | 9/2005 | Minturn | 709/250 |
| 2007/0220022 A1 * | 9/2007 | Lankinen et al. | 707/101 |
| 2008/0065655 A1 * | 3/2008 | Chakravarthy et al. | 707/100 |
| 2008/0147614 A1 * | 6/2008 | Tam et al. | 707/3 |
| 2008/0249973 A1 * | 10/2008 | Corl et al. | 706/47 |
| 2010/0161317 A1 * | 6/2010 | Au | 704/9 |

OTHER PUBLICATIONS

Luke et al, Evolving Graph and Networks with Edge Encoding: Preliminary Report, Jul. 1996, Genetic Programming 96 (GP96).*
The Neo Database—A Technology Introduction (Nov. 23, 2006).
Torben Back Pedersen and Christian S. Jensen, "Multidimensional Database Technology" Computer, vol. 34, No. 12, pp. 40-46, Dec. 2001.

(Continued)

*Primary Examiner* — Frantz Coby
(74) *Attorney, Agent, or Firm* — Davis Wright Tremaine, LLP; Michael J. Donohue; Heather M. Colburn

(57) ABSTRACT

A database system storing a data structure. The data structure includes a plurality of data nodes that each store a type and a value. None of the data nodes are linked directly to one another. The data structure also includes a plurality of context nodes that are each linked to at least two data nodes. The context nodes do not store data. Instead, each of the context nodes indicates a relationship exits between the data nodes connected to it.

78 Claims, 20 Drawing Sheets

OTHER PUBLICATIONS

Renzo Angles and Claudio Gutierrez, "Querying RDF data from a graph database perspective," In 2nd European Semantic Web Conference (ESWC2005) May 2005, Heraklion, Greece. Lecture Notes in Computer Science, vol. 3532/2005, pp. 346-360.

Srinath Srinivasa and Mistry Harjinder Singh, "GRACE: A Graph Database System," Proceedings of COMAD 2005b, Hyderabad, India, Dec. 2005.

Marc Gyssens and Laks V.S. Lakshmanan, "A foundation for multi-dimensional databases," Technical Report, Concordia University and University of Limburg, Feb. 1997, pp. 106-115.

George Colliat, "OLAP, Relational, and Multidimensional Database Systems," SIGMOD Record, vol. 25, No. 3, Sep. 1996, pp. 64-69.

Adrian Silvescu et al., (2002) Graph Databases. Technical Report. May 2002.

Malcolm Atkinson et al., "The Object-Oriented Database System Manifesto." In Proceedings of the First International Conference on Deductive and Object-Oriented Databases, pp. 223-240, Kyoto, Japan, Dec. 1989. Also appears in Building an Object-Oriented Database System: The Story of O2. F. Bancilhon, C. Delobel, and P. Kanellakis. (eds.) Morgan Kaufmann, 1992.

Steve Kwan, "MINISIS Database Architecture," discussion, 6 pages, undated, Minisis Inc.

* cited by examiner

TABLE: MOVIES — 30

| MOVIE ID | TITLE |
|---|---|
| 1 | APOLLO 13 |
| 2 | CAST AWAY |

**Figure 2
(Prior Art)**

TABLE: CHARACTERS — 32

| CHARACTER ID | MOVIE ID | CHARACTER |
|---|---|---|
| 1 | 1 | JIM LOVELL |
| 2 | 1 | FRED HAISE |
| 3 | 1 | JACK SWIGERT |
| 4 | 1 | KEN MATTINGLY |
| 5 | 2 | CHUCK NOLAND |

**Figure 3
(Prior Art)**

TABLE: ACTORS — 34

| ACTOR ID | NAME |
|---|---|
| 1 | TOM HANKS |
| 2 | BILL PAXTON |
| 3 | KEVIN BACON |
| 4 | GARY SINISE |

**Figure 4
(Prior Art)**

TABLE: ROLES — 36

| ACTOR ID | CHARACTER ID |
|---|---|
| 1 | 1 |
| 2 | 2 |
| 3 | 3 |
| 4 | 4 |
| 1 | 5 |

**Figure 5
(Prior Art)**

TABLE: TYPES — 3200

| TYPE ID | TYPE | BRIDGE |
|---|---|---|
| 1 | MOVIE | NO |
| 2 | CHARACTER | NO |
| 3 | ACTOR | NO |
| 4 | MOVIE ID | YES |
| 5 | CHARACTER ID | YES |
| 6 | ACTOR ID | YES |

Figure 18

TABLE: DENORMALIZED CONTEXT LAYER — 3340

| CONTEXT NODE ID | NODE ID | NODE ID | NODE ID |
|---|---|---|---|
| 1040 | 1010 | 1020 | 1030 |
| 1040 | 1010 | 1030 | 1020 |
| 1040 | 1020 | 1010 | 1030 |
| 1040 | 1020 | 1030 | 1010 |
| 1040 | 1030 | 1010 | 1020 |
| 1040 | 1030 | 1020 | 1010 |

DATABASE SYSTEM STORING A DATA STRUCTURE THAT INCLUDES DATA NODES CONNECTED BY CONTEXT NODES AND RELATED METHOD

CROSS REFERENCE TO RELATED APPLICATION(S)

This application claims the benefit of U.S. Provisional Application No. 60/916,500, filed May 7, 2007.

BACKGROUND OF THE INVENTION

1. Field of the Invention

The present invention is directed generally to database systems.

2. Description of the Related Art

Large-scale data management and analysis of data including complex relationships is not well supported by currently available database systems. Prior art database systems include a variety of different database designs, each having advantages over the others with respect to particular aspects of data management and analysis. Examples of prior art database systems include relational database systems, hierarchical database systems, network database systems, multidimensional database systems, graph database systems, and object database systems.

The various prior art databases may be understood with reference to the following simplistic example. In this example, a user desires to store the names of a portion of the actors in the movies "Apollo 13" and "Cast Away." The following Table 1 includes the sample data to be stored in this example.

TABLE 1

Sample Data

| Movie | Actor | Character |
|---|---|---|
| Apollo 13 | Tom Hanks | Jim Lovell |
| Apollo 13 | Bill Paxton | Fred Haise |
| Apollo 13 | Kevin Bacon | Jack Swigert |
| Apollo 13 | Gary Sinise | Ken Mattingly |
| Cast Away | Tom Hanks | Chuck Noland |

Referring to FIG. 1, an exemplary data model 10 for use with a relational database system is provided. The data model 10 includes a movies table 12, a characters table 14, an actors table 16, and a roles table 18.

The movies table 12 includes two fields, "MOVIE ID" and "TITLE." The characters table 14 includes three fields, "MOVIE ID," "CHARACTER ID" and "CHARACTER NAME." The actors table 16 includes two fields, "ACTOR ID" and "NAME." The roles table 18 includes two fields, "CHARACTER ID," and "ACTOR ID."

The letters "PK" next to the "MOVIE ID" field of the movies table 12, the "CHARACTER ID" field of the characters table 14, and the "ACTOR ID" field of the actors table 16 indicate these fields are the primary keys of their respective tables. In the roles table 18, the fields "ACTOR ID" and "CHARACTER ID" together form a compound primary key. The value stored within the primary key uniquely identifies each row of the table. In this example, each of the primary keys may be, for example, a unique integer value.

The letters "FK1" next to the "MOVIE ID" field of the characters table 14 indicate it is a foreign key. A foreign key links the values stored within the field to a value in the primary key of another table. In this case, as indicated by arrow 22, the "MOVIE ID" field of the characters table 14 is linked to the "MOVIE ID" field of the movies table 12.

The roles table 18 links actors to characters without duplicating the entry of either an actor or a character into the tables of the data model 10. In other words, the roles table 18 merely defines the relationship between the actors and characters without storing or providing any additional data. The letters "FK1" next to the "CHARACTER ID" field indicate it is a foreign key. As indicated by arrow 24, the foreign key "CHARACTER ID" of the roles table 18 is linked to the primary key "CHARACTER ID" of the characters table 14. The letters "FK2" next to the "ACTOR ID" field indicate it is a foreign key. As indicated by arrow 26, the foreign key "ACTOR ID" of the roles table 18 is linked to the primary key "ACTOR ID" of the actors table 16.

FIGS. 2-5 provide data views of the movies table 12, the characters table 14, the actors table 16, and the roles table 18, respectively, with the data of Table 1 stored therein. Specifically, table 30 of FIG. 2 provides a data view of the data stored in the movies table 12. Table 32 of FIG. 3 provides a data view of the data stored in the characters table 14. Table 34 of FIG. 4 provides a data view of the data stored in the actors table 16. Table 36 of FIG. 5 provides a data view of the data stored in the roles table 18.

Relational database systems are the most widely adopted standard for Online Transaction Processing (OLTP). They excel at processing tabular data and supporting pre-defined relationships between data elements stored within tables. Further, relational database systems are extremely efficient with locality on the storage layer when persisted to disk. However, structuring queries to extract the desired information for analysis using the pre-defined relationships requires a great deal of skill. For example, to determine the actors appearing in the movie "Apollo 13," a query would have to join all four of the tables within the data model 10. In some cases, the time required to execute complex queries may be substantial. Further, if the nature of the relationships within the database changes, the tables and the relationships between them may require a time consuming restructuring operation.

FIG. 6 provides a block diagram illustrating the sample movie data stored in a tree-like structure 100 of a hierarchical database system. Within a hierarchical database, each node 110, 114, 118, 122, 126, 130, 134, 138, 142, 146, and 150 stores a single data element and is linked to at most one parent node. However, each node may have multiple child nodes. For example, node 114 is linked to a child node 122 by link 120, a child node 126 by link 124, and a child node 130 by link 128. However, notice the data element "Tom Hanks" is duplicated at nodes 134 and 150. FIG. 7 provides a view of the data stored in the tree-like structure 100 extracted by a traversal of the tree. Because the nodes are organized into a well-known tree-like structure 100, many well-known algorithms for processing and traversing trees may be used to process the data.

Hierarchical database systems excel at processing structured data naturally falling into a hierarchy. Hierarchical database systems may also be extremely fast at traversing discrete data because the structure leverages well-known and optimized tree traversal algorithms. Hierarchical database systems may be used in time-critical high performance applications.

FIG. 8 is a block diagram illustrating the sample movie data stored in a network structure 200 of a network database system is provided. Network database systems are similar to hierarchical database systems; however, the child data elements of a network database system may be linked to multiple parent nodes. Because a node may be linked to multiple parent nodes, the network structure 200 avoids the duplication of the node storing the name "Tom Hanks." Specifically, the node 210, which stores the name "Tom Hanks," is linked to node 216 (character "Jim Lovell") by link 212 and node 218 (character "Chuck Noland") by link 214. Because the nodes are organized into a network structure 200, instead of the tree-like structure 100, well-known and optimized network algorithms may be used to analyze the data stored therein.

FIG. 9 provides a conceptual illustration of the sample movie data stored in a multi-dimensional structure 300 of a multidimensional database system system. The data elements are addressed according to their corresponding values along a first axis 310 labeled, in this case, "MOVIES" and a second axis 320 labeled, in this case, "Characters." For illustrative purposes, the first axis 310 has been labeled the x-axis and the second axis 320 the y-axis. The contents of each location 322 (i.e., unique pair of values along the x-axis and y-axis) is an actor who played a particular character selected along the y-axis in a particular movie selected along the x-axis.

Additional axes may be added to increase the number of dimensions of the multi-dimensional structure 300. For example, a third axis 330 labeled, in this case, "TIME" may be added to the multi-dimensional structure 300. The third axis 330 may be labeled the z-axis and may signify time or versions (e.g., remakes) of a particular movie and consequently the combination of a particular movie and a particular character may be used to index more than one actor along the z-axis. For example, the Shakespearean play "Hamlet" has been made into several movies. To determine which actors have played the lead character Hamlet, one need only select the movie "Hamlet," and the character "Hamlet" for all values of the z-axis. While the multidimensional database system depicted in FIG. 9 has three dimensions, any number of dimensions may be used to construct the multi-dimensional structure 300.

Obviously, not all movies have been remade or have alternate versions. Consequently, many multidimensional database systems suffer from a large number of vacant cells when the data is sparse. Further, a multidimensional database system does not provide a mechanism by which relationships within the data may be determined other than via indexing along each of the dimensions. While multidimensional databases are an excellent option for multidimensional analysis, they lack navigational associative search capabilities similar to those found in graph database systems. On the other hand, multidimensional database systems are extremely effective at Online Analytical Processing (OLAP) and related knowledge discovery mechanisms.

FIG. 10 provides block diagram illustrating the sample movie data stored in a graph structure 400 of a graph database system. A graph database system organizes data into a graph of linked nodes. Generally, the links are referred to as edges.

To create the graph structure 400, a head node 402 for the tables is created. A node is then created for each of the tables of the data model 10 of the relational database system (see FIG. 1) and each node is linked to the head node 402. Specifically, a node 412 is created to correspond to the movies table 12 of FIG. 1 and linked to the head node 402 by a link 413, a node 416 is created to correspond to the characters table 14 of FIG. 1 and linked to the head node 402 by a link 417, and a node 430 is created to correspond to the actors table 16 of FIG. 1 and linked to the head node 402 by a link 431. However, in this example, a node was not created for the roles table 18 of FIG. 1 because that table merely relates the actors table 16 and the characters table 14 which may be accomplished in the graph structure 400 with links.

A node is then created for each record within the movies table 12 (i.e., each instance of a movie within the table). In this example, a node 440 is created for the record corresponding to "Apollo 13" and linked by a link 442 to the "MOVIES" node 412. A node 444 is created for the record corresponding to "Cast Away" and linked by a link 446 to the "MOVIES" node 412. Each of these nodes may be linked to the underlying data, i.e., "MOVIE ID" and "TITLE" illustrated in the movies table 12 of FIG. 1.

A node is then created for each record within the characters table 14 of FIG. 1. For illustrative purposes, FIG. 10 includes only the characters played by Tom Hanks. Consequently, the graph structure 400 includes a node 450 corresponding to the character "Jim Lovell." The node 450 is linked to the "CHARACTERS" node 416 by a link 452. The graph structure 400 also includes a node 454 corresponding to the character "Chuck Noland," which is linked to the "CHARACTERS" node 416 by a link 456.

The foreign keys of the relational database system are replaced with links. For example, the foreign key linking the characters to the movies is replaced by a link 460 linking the node 450 ("Jim Lovell") to the node 440 ("Apollo 13") and a link 462 linking the node 454 ("Chuck Noland") to the node 444 ("Cast Away"). The links 460 and 462 are labeled with the term "MOVIE" because the nature of the relationship between linked nodes may be ambiguous. The label defines or specifies the relationship between the nodes. In this case, the label specifies the characters of nodes 450 and 454 appear within the movies of nodes 440 and 444, respectively.

Then, a node is created for each record within the actors table 16 of FIG. 1. In FIG. 10, for illustrative purposes, only the actor "Tom Hanks" has been included. Consequently, the graph structure 400 includes a node 470 corresponding to the actor "Tom Hanks." The node 470 is linked to the "ACTORS" node 430 by a link 472. The foreign key linking the characters to the actors in FIG. 1 is replaced by a link 476 linking the node 450 ("Jim Lovell") to the node 470 ("Tom Hanks") and a link 474 linking the node 454 ("Chuck Noland") to the node 470 ("Tom Hanks"). The label "ACTOR" on the links 474 and 476 specifies the actor of the node 470 plays the characters of nodes 450 and 454.

In this example, the graph structure 400 of the graph database system preserves both the original table structure, linking each record within a table with a context node (e.g., nodes 412, 416, and 430) and the original foreign key relationships (e.g., links 460, 462, 474, and 476).

Graph database systems excel at structural queries and identifying relationships between nodes using its associative search capabilities. Graph database systems are typically used in data mining applications, but suffer from ambiguous connections created in highly dimensional and interconnected data. Graph database systems also encounter locality problems at the storage layer when persisted to disk.

Finally, custom data structures may be used to construct object database systems. However, such object database systems are typically built for specialized uses and are ill suited for generalized applications.

While each of these database systems provides a partial solution, none of them can perform all data manipulation tasks with equal efficiency. For this reason, many users will use more than one database system to process the same source data thereby leveraging the benefits of each system to perform a desired analysis. For example, a relational database may be used to store the source data, a multidimensional database or object database may be used to analyze the source data, and a graph database may be used to discover how the individual data elements interrelate with one another. Consequently, a need exists for a database system that can efficiently address each of these needs. Prior art database systems are being pushed past their design limits as the demand for data mining of continuous data streams increases. Consequently, a need exists for database systems capable of analyzing source data to extract useful information for that source data in a timely and efficient manner. The present application provides these and other advantages as will be apparent from the following detailed description and accompanying figures.

BRIEF DESCRIPTION OF THE SEVERAL VIEWS OF THE DRAWING(S)

FIG. 2 is a data view of data elements stored within a movies table of the data model of FIG. 1.

FIG. 3 is a data view of data elements stored within a characters table of the data model of FIG. 1.

FIG. 4 is a data view of data elements stored within an actors table of the data model of FIG. 1.

FIG. 5 is a data view of data elements stored within a roles table of the data model of FIG. 1.

FIG. 18 is a data view of an exemplary embodiment of a table configured to store a plurality of valid types and a bridge indicator for each type for use with the data model of FIG. 17.

FIG. 20 is a partial data view of a table of the data model of FIG. 17 after the table has been denormalized.

DETAILED DESCRIPTION OF THE INVENTION

Aspects of the present invention include a database system and its underlying data structure. In the data structure, a data node represents each unique type/value pair within the source data. For example, if the source data includes a field "MOVIE TITLE" and a data value within the "MOVIE TITLE" field equal to "Apollo 13," this type/value pair will have a data node "MOVIE TITLE: Apollo 13" within the data structure. Relationships between the data nodes are represented by links. Within the data structure, the data nodes are not linked directly to one another. Instead, a context node is located between two related data nodes and linked to both.

Figure 11:
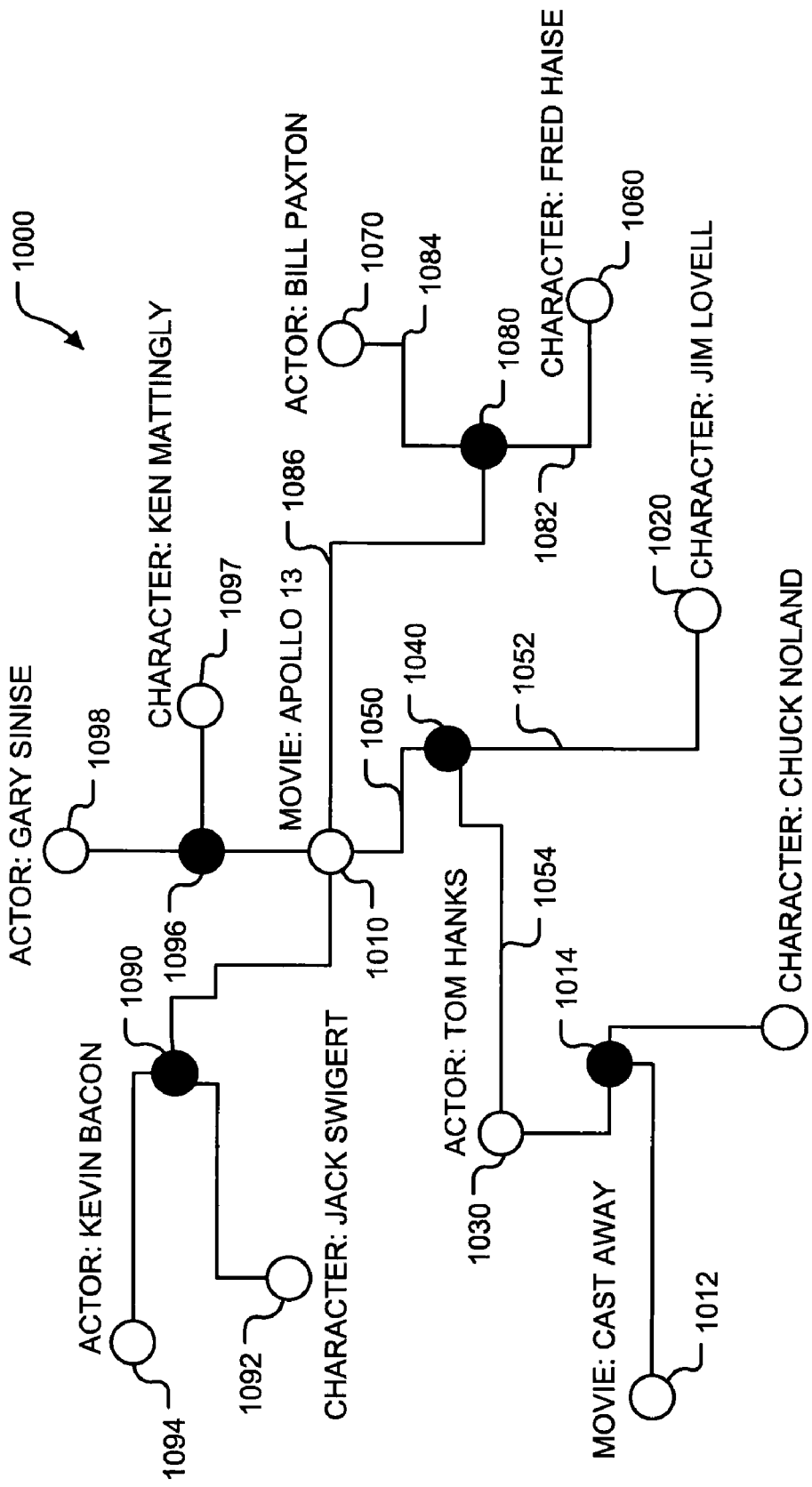
FIG. 11 is a block diagram illustrating a data structure of a database system constructed according to the present invention.

For illustrative purposes, FIG. 11 provides a block diagram illustrating the sample movie data of Table 1 above organized into data nodes (illustrated as empty circles) linked together via one or more context nodes (illustrated as solid circles) to form a data structure 1000. If one knows the location of a particular data node within the data structure 1000, all data nodes related in some manner to the particular data node may be located simply by traversing the links connected to the particular data node.

In some respects, the data structure 1000 focuses on the analytic capabilities of the database system instead of storage capabilities. The data structure 1000 provides the associative search capabilities of a graph database system, the tabular capabilities of a relational database system, while also allowing the multidimensional analysis provided by a multi-dimensional database.

Figure 9:
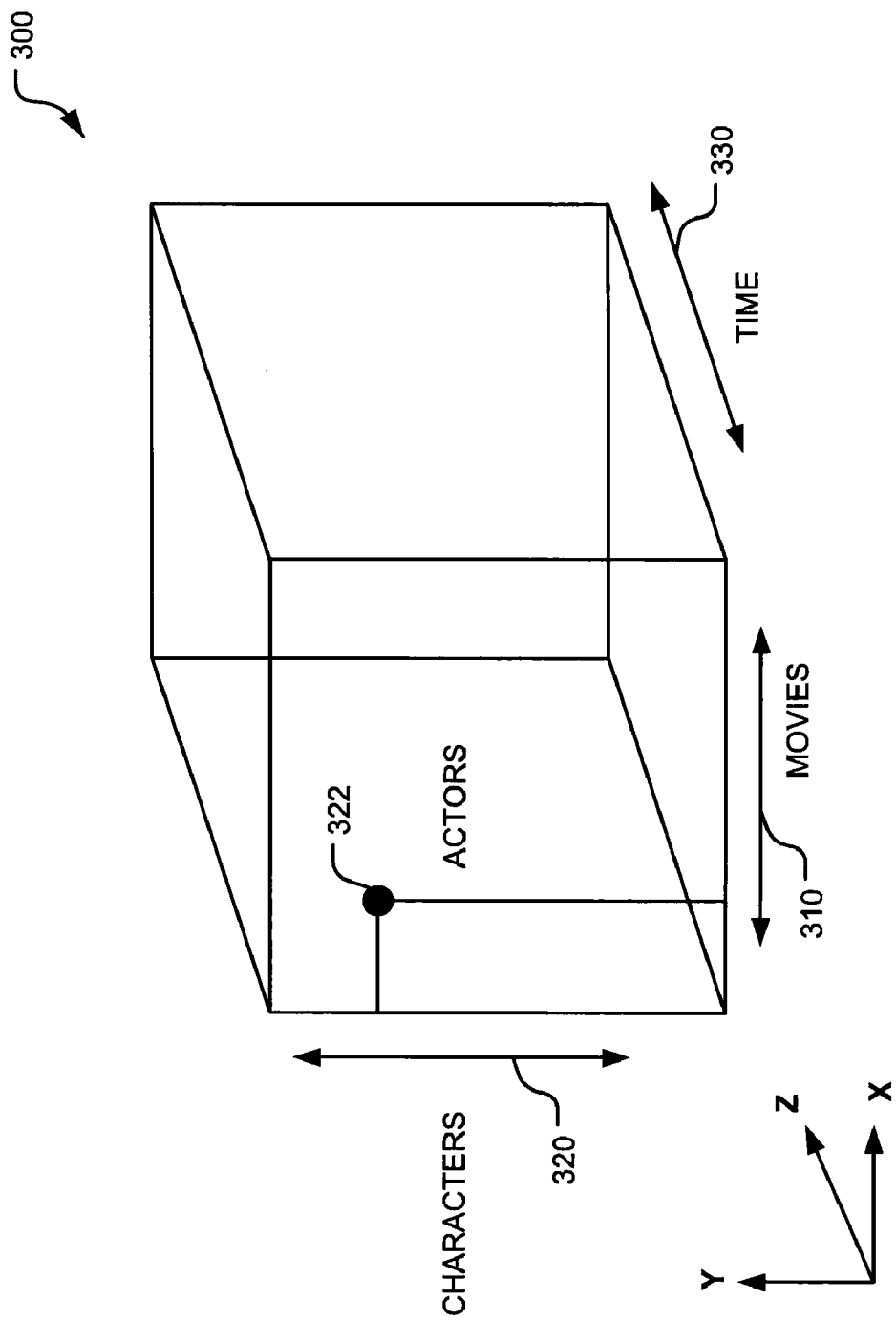
FIG. 9 is a conceptual diagram illustrating a multidimensional structure of a multidimensional database system constructed according to the prior art.

For example, referring to FIG. 9, if one wanted to view all actors and the characters each actor played in the movie "Apollo 13," a multidimensional database system would produce this report by constraining the first axis 310 (i.e., the "MOVIES" dimension) to "Apollo 13" and reporting the all characters along the second axis 320 (i.e., the "CHARACTERS" dimension constrained by its parent dimension, the "MOVIES" dimension) and all values (i.e., actors) within each location 322 corresponding to each character.

Figure 1:
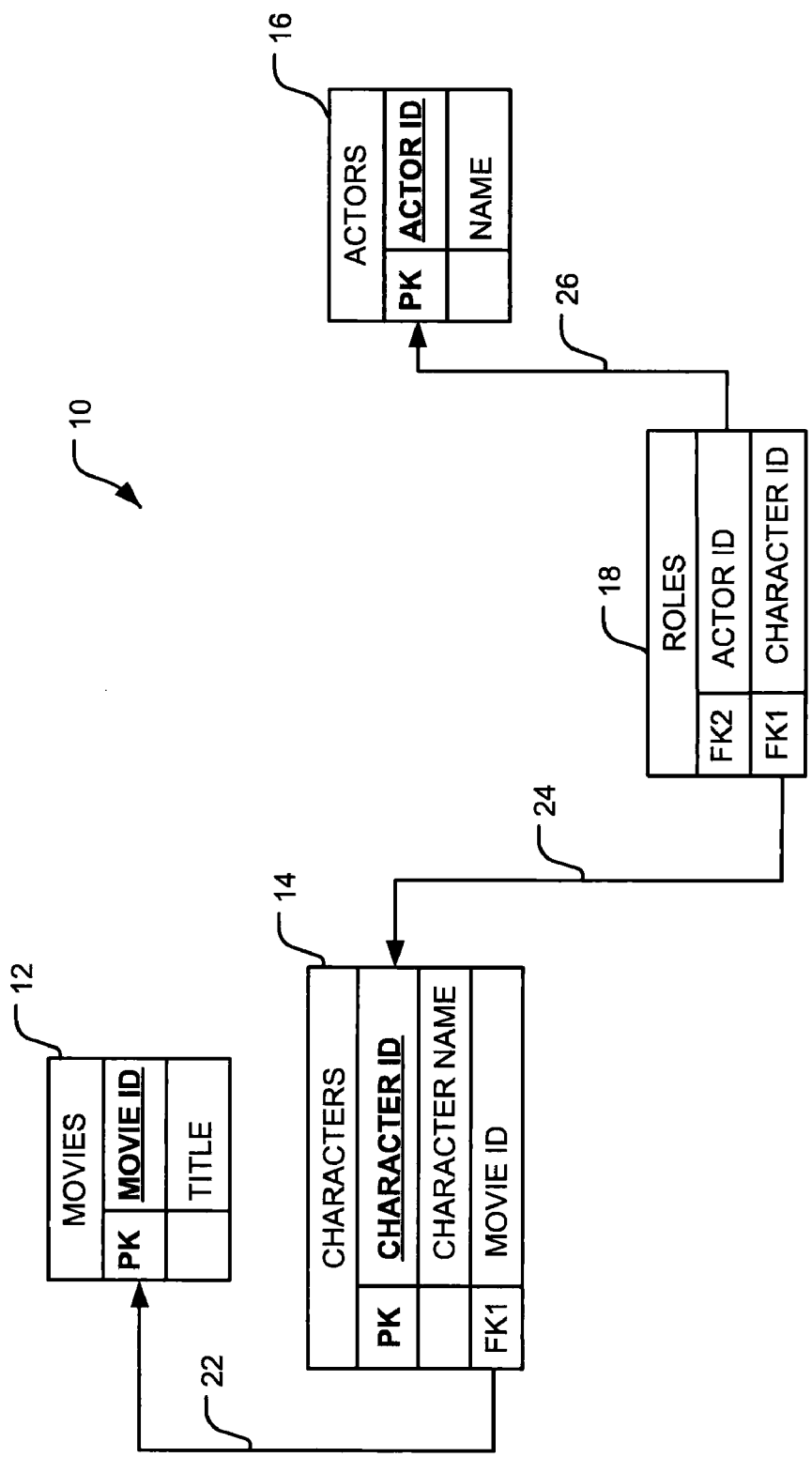
FIG. 1 is a schematic view of a data model of a relational database system constructed according to the prior art.
Figure 7:
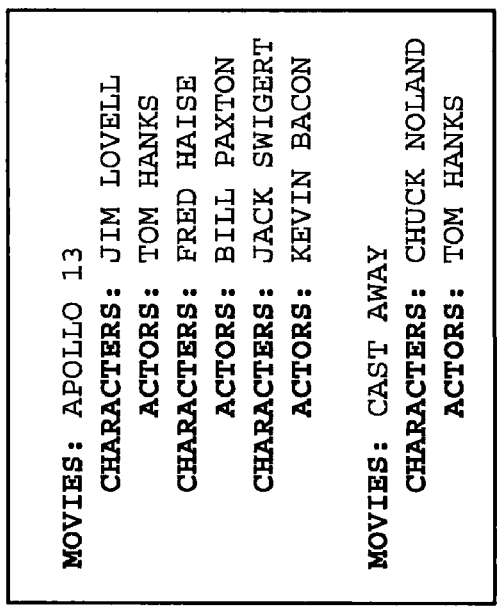
FIG. 7 is a hierarchical view of the data elements stored within the tree-like structure of FIG. 6.
Figure 6:
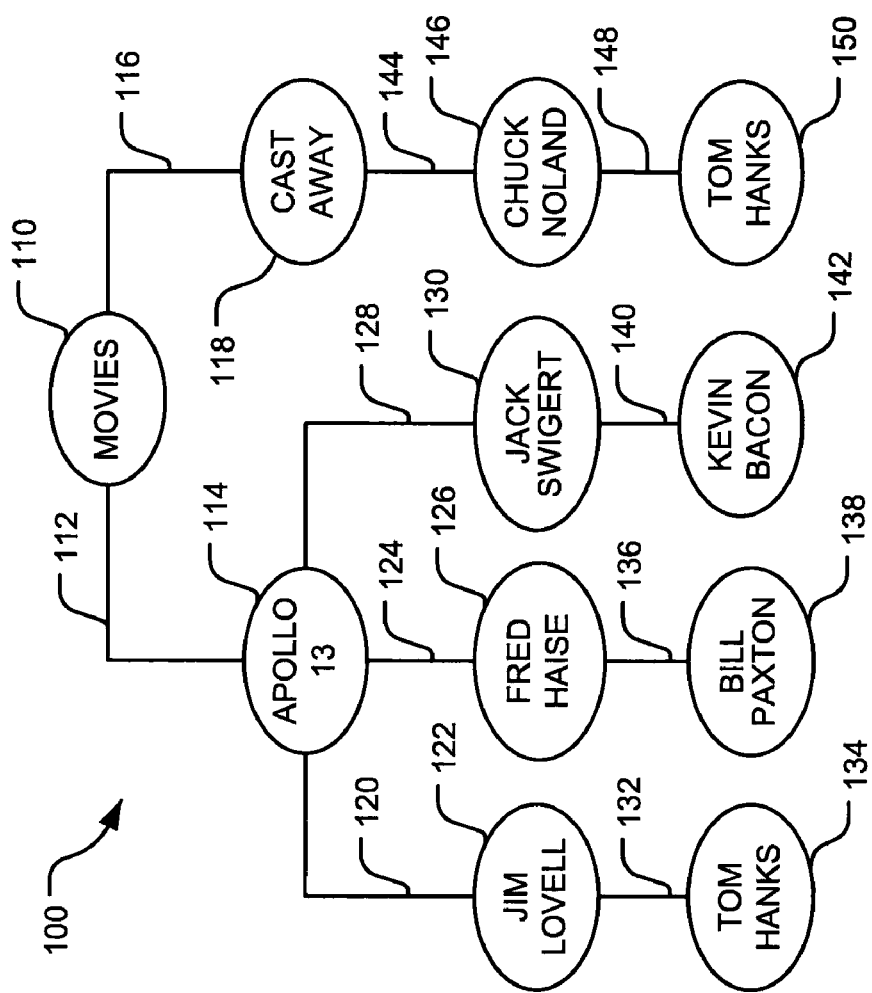
FIG. 6 is a block diagram illustrating a tree-like structure of a hierarchical database system constructed according to the prior art.
Figure 8:
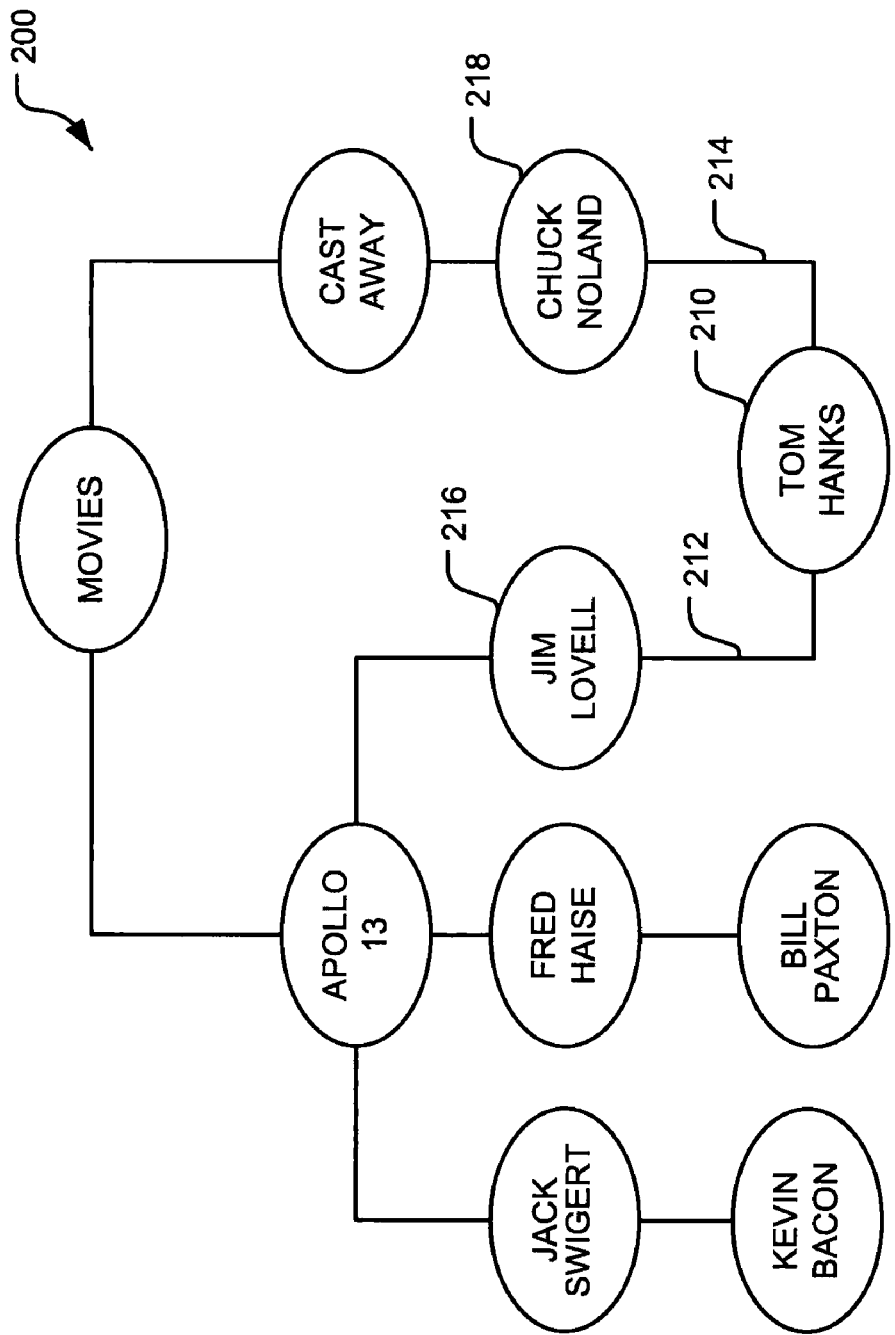
FIG. 8 is a block diagram illustrating a network structure of a network database system constructed according to the prior art.

Turning to the data structure 1000, each unique type within the type/value pairs may be considered a distinct dimension. Each type may be indexed thereby simplifying the search and aggregation operations required to create the type of views produced by the multidimensional database system. Using the data structure 1000, one could view all actors and the characters each actor played in the movie "Apollo 13" by first locating the data node 1010 (i.e., the data node corresponding to the type/value pair "MOVIE: Apollo 13") using an index search procedure, which is typically very fast. Next, the database system would navigate all of the data nodes 1020, 1060, 1092, and 1097 of the type "CHARACTER" linked to data node 1010. These data nodes are also indexed from the perspective of data node 1010 by the context nodes 1040, 1080, 1090, and 1096 located between the data node 1010 and the data nodes 1020, 1060, 1092, and 1097, respectively, which may provide fast performance. Finally, the database system would navigate to all data nodes 1030, 1070, 1094, and 1098 of type "Actor" through the same context nodes 1040, 1080, 1090, and 1096, respectively. These operations would generate the following report, which resembles a portion of the view of the data stored in the tree-like structure 100 extracted by the traversal of the tree depicted in FIG. 7:

Movie: Apollo 13
    Character: Jim Lovell
        Actor: Tom Hanks
    Character: Fred Haise
        Actor: Bill Paxton
    Character: Jack Swigert
        Actor: Kevin Bacon
    Character: Ken Mattingly
        Actor: Gary Sinise These operations create a slice of an OLAP hypercube. The slice may be displayed in the above hierarchical report that shows a single view of the overall hypercube. While a very simplistic example has been described, these operations may be extended to any number of dimensions. These operations may also be described as "pivoting" the movie "Apollo 13" against the actors stored in the database to determine who was an actor in the movie. In essence, the inventive database system may behave like a multidimensional database system by treating each type within the type/value pairs as a dimension and using multidimensional database system routines for analysis on each type.

Conceptually, the data structure 1000 may be viewed as having two layers, a data layer and a context layer. The data layer includes all of the data nodes (depicted as the empty circles in FIG. 11). The context layer includes all of the context nodes (depicted as solid black circles in FIG. 11) and the links connecting the context nodes to the data nodes. In other words, the context layer provides the relationships (i.e., context) between the data nodes.

In a graph database system, graph edges connect the data nodes together. In the data structure 1000, instead of graph edges connecting the data nodes together directly, graph edges (or links) connect the data layer (i.e., data nodes) to the context layer (i.e., context nodes). This creates a graph-like data structure that defines the context of all data nodes.

In some respects, the data structure 1000 provides for efficient data mining and thus provides the advantages of a graph database. The data structure 1000 may also provide capabilities commonly seen in relational and multi-dimensional databases. For example, each context or context node functions as a record pointer. Using the context nodes, the data nodes may be organized into a table structure. Furthermore, because the links are explicitly stored, hierarchical report building is a simplistic traversal of the two graph layers (as seen in Multi-dimensional databases).

The context layer serves as an index into the data structure 1000, which may be used to analyze the relationships between the data nodes as well as the contents of the data nodes. The context layer may also be used to optimize the performance of data mining operations. For example, the context layer itself may be represented by a pair of indexes. One of the indexes may provide facilities to traverse from the context nodes to the data nodes. The other index may allow traversal from the data nodes to the context nodes. These indexes may provide fast traversal performance. Further, these indexes may facilitate statistical data mining operations. As an example, an analysis of one or both of the indexes may identify data nodes and/or context nodes having relatively large numbers of links connected thereto. By way of non-limiting examples, the index providing facilities to traverse from the context nodes to the data nodes may be used to identify context nodes linked to more than a threshold number of data nodes, context nodes linked to the largest number of data nodes, and the like. The index providing facilities to traverse from the data nodes to the context nodes may be used to identify data nodes linked to more than a threshold number of context nodes, data nodes linked to the largest number of context nodes, and the like. Similarly, these indexes could be used to discover outlier or orphaned portions of data. In other words, the context layer facilitates mining the relationships between the data nodes as well as the data stored within the data nodes.

Figure 10:
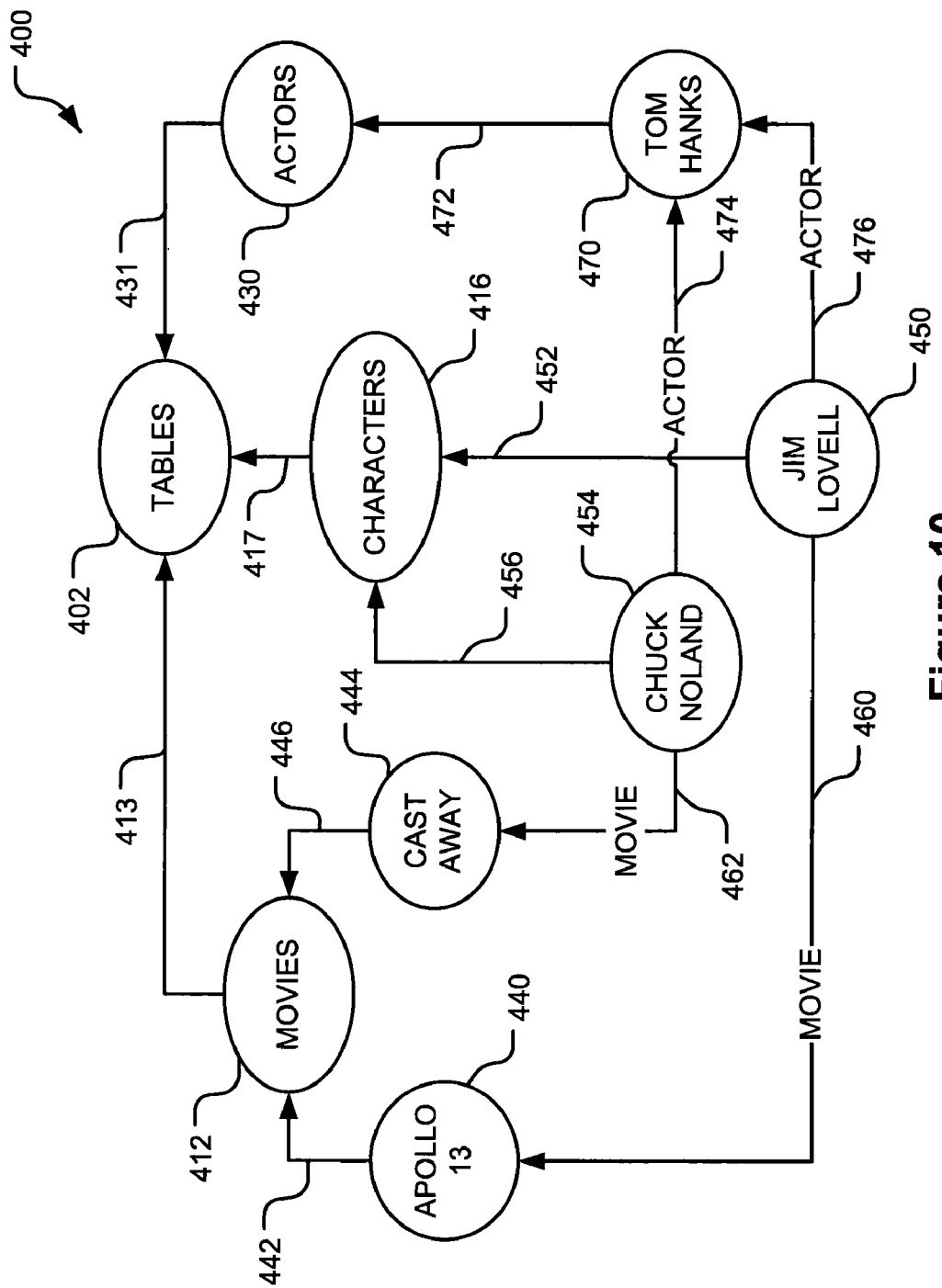
FIG. 10 is a block diagram illustrating a graph structure of a graph database system constructed according to the prior art.

To better illustrate the data structure 1000, a brief comparison of the data structure 1000 in FIG. 11 and the graph structure 400 of FIG. 10 follows. As mentioned above, traditional graph data structures may result in ambiguity in the relationship between linked nodes. Typically, this ambiguity is resolved by labeling the edges of the graph structure 400 to explicitly define the relationship between the linked nodes. For example, in the graph structure 400 of FIG. 10, the link 460 (or edge) linking the character node 450 to the first movie node 440 is labeled "MOVIE" to signify that the character "Jim Lovell" is a character within the movie "Apollo 13."

Labeling the edges works well for defining a few relationships but the labels become far too complex to process as more relationships are defined between the two data nodes. For example, consider the following facts: Tom Hanks was director of the series "From the Earth to the Moon;" Tom Hanks was an actor in "From the Earth to the Moon;" and Tom Hanks was an actor in the movie "Apollo 13." In a graph database system, five nodes would be created, one each for the following data elements:

Name: Tom Hanks
    Movie: "From the Earth to the Moon"
    Position: Actor
    Position: Director
    Movie: Apollo 13

Each of the nodes "Movie: From the Earth to the Moon," "Position: Actor," "Position: Director," and "Movie: Apollo 13" would be linked to the node storing "Name: Tom Hanks." No other links would be constructed. While the graph structure would show Tom Hanks was involved with both movies and was a director and an actor, the graph structure would not show in which movie Tom Hanks was an actor and which movie he was a director.

To resolve this ambiguity, a directed edge graph may be constructed. In such a graph, the link between the node storing "Name: Tom Hanks" and the node storing "Movie: Apollo 13" would be labeled "Position: Actor." The link connecting the node storing "Name: Tom Hanks" and the node storing "Movie: From the Earth to the Moon" would have two labels: "Position: Actor" and "Position: Director." The nodes storing "Position: Actor" and "Position: Director" are not included in the directed edge graph. Within the directed edge graph the relationships are now correctly defined, however, there are multiple relationships between the node storing "Name: Tom Hanks" and the node storing the "Movie: From the Earth to the Moon." While the complexity in this example is minimal, in highly complex structured data stores, the number of labels along the edges connecting the nodes may be become complicated because the nodes may be connected to one another through tens or hundreds of relationships.

In contrast, in the data structure 1000, the context is provided by the context layer, which includes unlabeled links and context nodes. Ambiguity is avoided because context is not provided by a label associated with each of the links. Instead, context is established by the existence of a link to a common context node shared by (i.e., linked to) one or more other data nodes. The field of the data node identifies the type of value stored in the data node. The context may be inferred from the link (and the context node) linking a value of a particular type to a value of another type. For example, if a first data node is of a type "Character" and the first data node is linked to a second data node of a type "Movie," the relationship inferred is that the first data node is a character within the second data node.

The relationships between the various data nodes may be readily identified. For example, referring to FIG. 11, if one wanted to find a link or commonality between a data node 1010 storing the type/value pair "MOVIE: Apollo 13" and a data node 1012 storing the type/value pair "MOVIE: CAST AWAY" one need only locate each of these nodes within the data structure 1000 and execute any one of many known techniques for locating a path between two nodes in a graph or network. For example, a shortest path between the data nodes 1010 and 1012 may be found using Dijkstra's algorithm and the like. In this case, the shortest path (in fact the only path illustrated in FIG. 11) includes a context node 1014, a data node 1030 storing the type/value pair "ACTOR: Tom Hanks," and a context node 1040.

Figure 12:
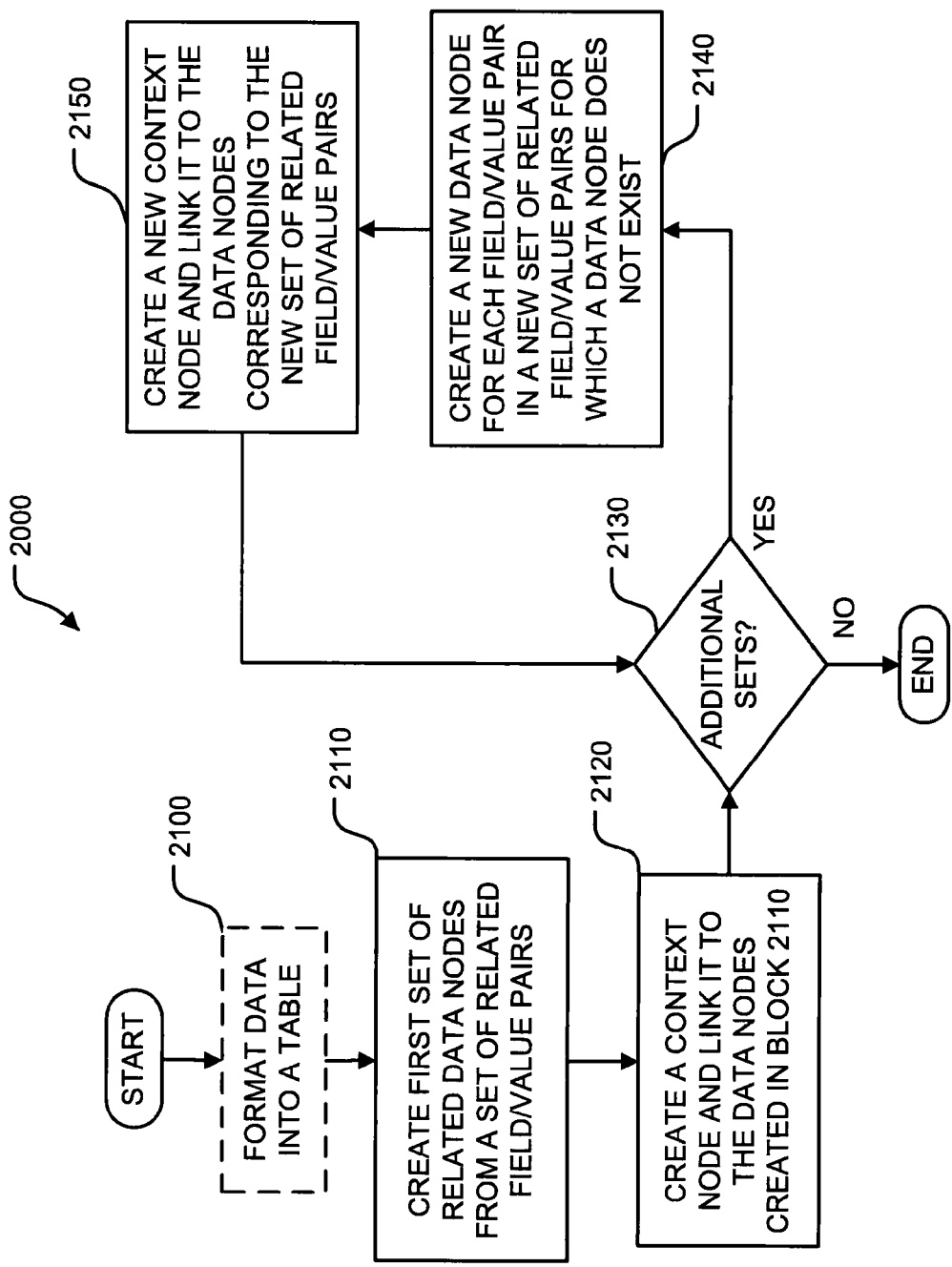
FIG. 12 is a block diagram illustrating a method of constructing the data structure of FIG. 11.

Referring to FIG. 12, a method 2000 of constructing the structure 1000 is provided. The data structure 1000 is constructed from structured data that includes a plurality of individual pieces of data. Each piece of data includes a type and a value that together form a type/value pair. The structured data also includes a plurality of relationships that identify related pieces of data within the structured data.

In an optional first block 2100, the data is formatted or organized into a table. With respect to the movie example, a table like Table 1 above may be created. If the data resides in a relational database system, in block 2100, the individual tables, e.g., the movies table 12, the characters table 14, and the actors table 16, may be joined using SQL queries well known in the art to create a single table, such as the example of Table 1. In many cases, the resultant table will include numerous duplicate entries of one or more data elements. For example, Table 1 includes numerous entries for the type/value pair "Movie: Apollo 13." The "ID" or index fields shown in Table 1 may be omitted because they do not contain data but rather function as keys in the data tables. If the data is stored in an alternate database system such as hierarchical database systems, network database systems, multidimensional database systems, graph database systems, object database systems, and the like methods known in the art for organizing the data stored therein into a two-dimensional table structure may be used in block 2100. Alternatively, if the data resides in another format, such as XML and the like, the data may be extracted directly from such a format without the creation of a table.

Figure 13:
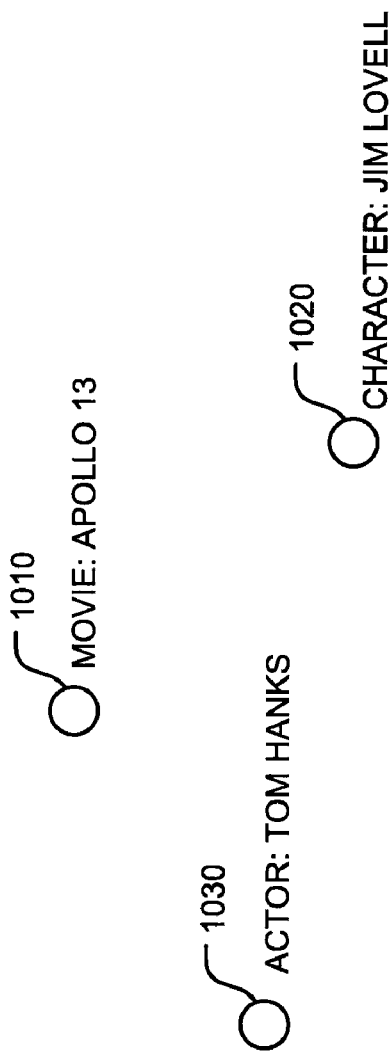
FIG. 13 is a block diagram illustrating a portion of the data structure of FIG. 11 that includes data nodes for a first row of Table 1 constructed using a portion of the method of FIG. 12.

Then, in block 2110, a first set of related data nodes is created from a first set of related type/value pairs. If the data resides in a table created in block 2100, a data node is created for each type/value pair residing in a single row selected from the table. FIG. 13 illustrates the structure 1000 after the creation of the data nodes for the first row of Table 1. At this point, the structure 1000 includes the data node 1010 for the type/value pair "MOVIE: Apollo 13," the data node 1020 for the type/value pair "CHARACTER: Jim Lovell," and the data node 1030 for the type/value pair "ACTOR: Tom Hanks."

If the data resides in an XML format, a tag may be used to define the type of each value in the file, thereby creating one or more sets of related type/value pairs. Then, in block 2110, the first set of related data nodes is created from one of the sets of related type/value pairs. Methods of extracting data from XML and similar formats are known in the art and will not be described in detail herein.

Figure 14:
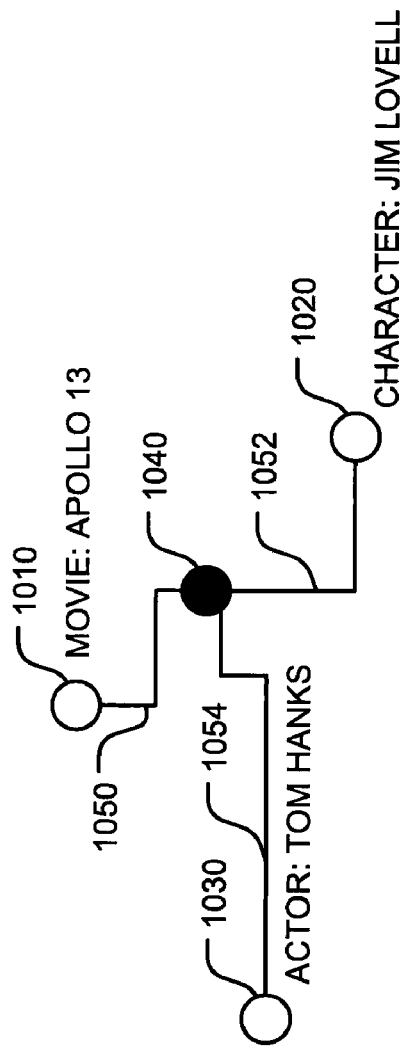
FIG. 14 is a block diagram illustrating a portion of the data structure of FIG. 11 that includes a context node linking together the data nodes for the first row of Table 1 constructed using a portion of the method of FIG. 12.

Next, in block 2120, a context node is created and linked to each of the data nodes created in block 2110. Referring to FIG. 14, with respect to the sample data, a context node 1040 is added to the structure 1000 and linked to the nodes 1010, 1020, and 1030 by links 1050, 1052, and 1054, respectively.

Figure 15:
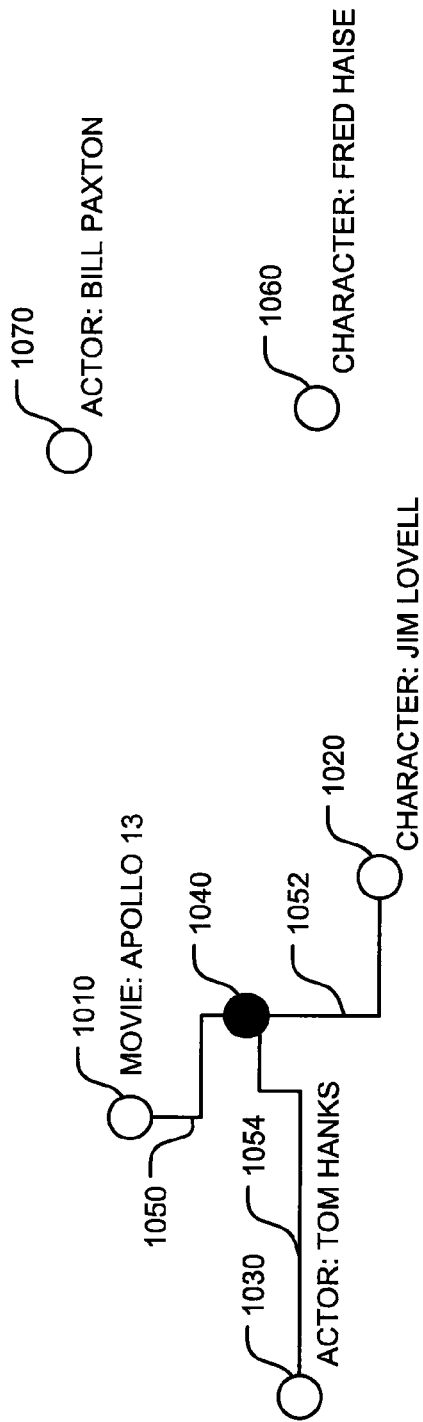
FIG. 15 is a block diagram illustrating a portion of the data structure of FIG. 11 that includes data nodes for a second row of Table 1 constructed using a portion of the method of FIG. 12.

In decision block 2130, a decision is made whether the data includes additional sets of related type/value pairs. If the decision is "NO," the data does not include an additional set of related type/value pairs, the method 2000 terminates. Otherwise, in block 2140, another set of related type/value pairs is selected. If the data resides in a table like Table 1, another row is selected from the table created in block 2100. Then, a new data node is created for each type/value pair for which a data node does not exist in the structure 1000. FIG. 15 illustrates the data structure 1000 after the creation of the nodes for the second row selected from Table 1. In FIG. 15, two new data nodes have been added, a data node 1060 for the type/value pair "CHARACTER: Fred Haise," and a data node 1070 for the type/value pair "ACTOR: Bill Paxton." Note, a new node for the type/value pair "MOVIE: Apollo 13" has not been added because a data node already exists for this type/value pair, namely the data node 1010.

Figure 16:
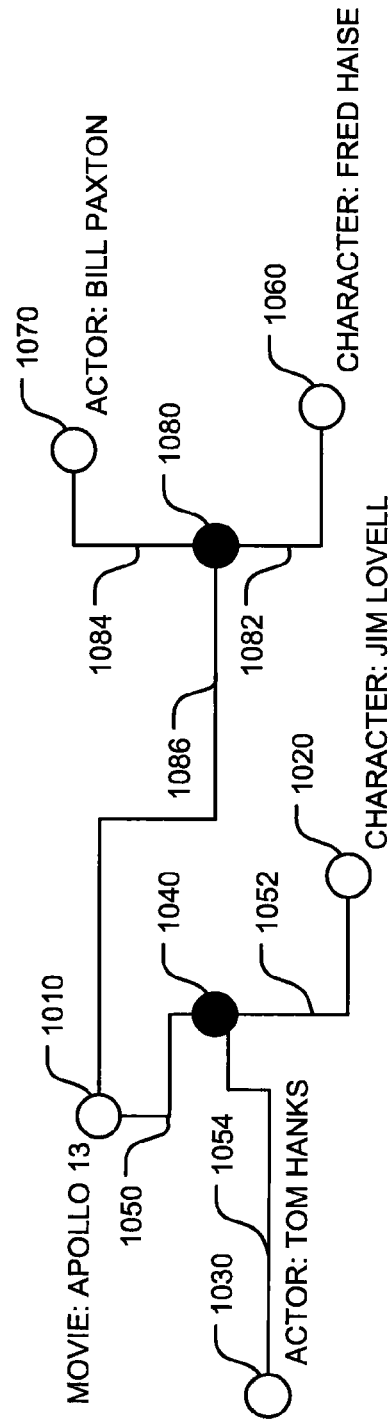
FIG. 16 is a block diagram illustrating a portion of the data structure of FIG. 11 that includes a context node linking together the data nodes for the second row of Table 1 constructed using a portion of the method of FIG. 12.

In block 2150, a new context node is created and linked to all of the data nodes of the selected set of related type/value pairs. For example, in FIG. 16, a context node 1080 is added to the data structure 1000 and linked to the new data nodes 1060 and 1070 by links 1082 and 1084, respectively. The context node 1080 is also linked to the pre-existing data node 1010 (i.e., type/value pair "MOVIE: Apollo 13") by a link 1086. In this manner, the context node 1080 is linked to all of the type/value pairs present in the selected set of related type/value pairs. Within the structure 1000, the nodes 1060 and 1070 are linked to the nodes 1020 and 1030 via the context nodes 1080 and 1040 and the data node 1010.

Finally, the method 2000 returns to decision block 2130 and either terminates if the selected set is the last set of related type/value pairs (e.g., the decision is "NO" because the selected row is the last row of the table) or repeats block 2140 (e.g., the decision is "YES" because the selected row is not the last row of the table). When the method 2000 terminates, the data structure 1000 depicted in FIG. 11 is constructed.

Figure 17:
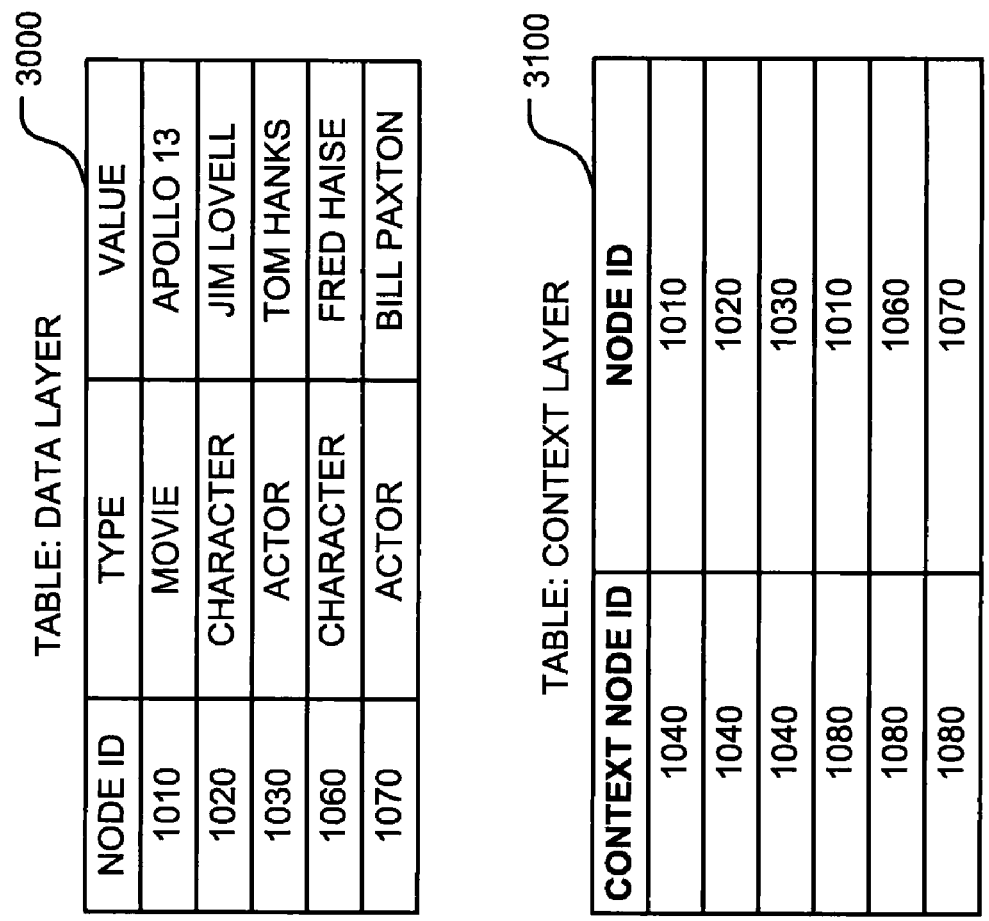
FIG. 17 is a data view of an exemplary embodiment of a data model configured to store the data structure of FIG. 11 within the tables of a relational database system.

In particular embodiments, the data structure 1000 may be stored within a relational database system. In such embodiments, each of the context and data layers may be stored in an indexed table. For example, FIG. 17 provides a data view of a table 3000 configured to store the data layer and a table 3100 configured to store the context layer. For illustrative purposes, data views of the table 3000 and the table 3100 include only a portion of the data structure 1000 of FIG. 16. For illustrative purposes, the reference numerals of FIG. 16 have been used as the values stored in the fields "NODE ID" and "CONTEXT NODE ID."

As is apparent to those of ordinary skill, because each data node appears only once within the data structure 1000, the table 3000 may include a constraint that every type/value pair entered into the table 3000 must be unique. Each row of the table 3100 stores a link that connects a particular context node (identified by its CONTEXT NODE ID) to a particular data node (identified by its NODE ID) within the data structure 1000. For example, the first (topmost) row depicted in table 3100 corresponds to the link 1050 of FIG. 16. The subsequent rows (in top to bottom order) correspond to links 1052, 1054,

1086, 1082, and 1084, respectively. A field (not shown) may be included in the table 3100 and used to store a link identifier.

As is apparent to those of ordinary skill, the method 2000 of FIG. 12 may be used to store the data of Table 1 above in the tables 3000 and 3100. After the data is formatted into a table in block 2100, in block 2110, a data node is created for each type/value pair by adding a new record (i.e., row) to table 3000. Then, in block 2110, a context node is created by creating a new CONTEXT NODE ID value and links are created by inserting a new row in the table 3100 for each link between the new context node and the data nodes of the first row of the table created in block 2100. If the first row is not the last row of the table created in block 2100, in block 2140, another row is selected for processing from the table and new data nodes created by inserting new rows into the table 3000. Then, in block 2150, a new context node is created by creating a new CONTEXT NODE ID value and links are created by inserting a new row in the table 3100 for each link between the new context node and the data nodes of the selected row of the table created in block 2100. The procedures of blocks 2140 and 2150 are repeated until all rows of the table created in block 2100 have been processed.

While the data structure 1000 has been described as being stored in two tables, it is apparent to those of ordinary skill in the art that the data structure 1000 may be stored within alternate data models implemented in a relational database system and such embodiments are within the scope of the present invention. For example, a new table, like table 3100 may be created for each context node created. In such embodiments, the field "CONTEXT NODE ID" may be omitted. In further embodiments, a table may be created for each type (i.e., unique value within the field "TYPE"). In such embodiments, it may be desirable to include a field that identifies the table(s) storing the data node(s) linked to each of the context nodes.

When the data structure 1000 is stored within a relational database system, additional tables may be included in accordance with well-known relational database construction techniques. For example, referring to FIG. 18, the relational database may include a table 3200 configured to store a list of valid values for the field "TYPE" of the table 3000. The table 3200 may include a "BRIDGE" field that indicates whether a particular value in the TYPE field is a bridge type. The "BRIDGE" field may be a Boolean field that indicates whether each value of the field "TYPE" is a bridge type.

A bridge type is used in a relational database to form a relationship between a primary key in one table and a foreign key in another table. A bridge type may also be used to form a relationship between a foreign key in one table and a foreign key in another table. For example, referring to the table 36 of FIG. 5, the values in the "ACTOR ID" field and the values in the "CHARACTER ID" field link the records in the table 34 to the records in the table 32, respectively. Each of the values stored in the "ACTOR ID" field identifies a unique record corresponding to an actor in the table 34 but does not store data related to the actor. Similarly, each of the values stored in the "CHARACTER ID" field identifies a unique record corresponding to a character in the table 32 but does not store data related the character. Each of these fields is bridge type field. Within the data structure 1000, the "ACTOR ID" field and the "CHARACTER ID" field may be used to create an "ACTOR ID" type and a "CHARACTER ID" type, respectively. The "ACTOR ID" type and the "CHARACTER ID" type are bridge types that may be used to link data nodes having the type "ACTOR" to data nodes having the type "CHARACTER" just as the "ACTOR ID" field and the "CHARACTER ID" field are used to link the records in the table 32 to the records in the table 34.

As explained above, in the data structure 1000, the mapping of two type/value pairs together is performed by the context nodes. However, it may be beneficial when reformatting data stored in a traditional relational database into the data structure 1000 to add a data node for the values in the bridge type fields. For example, the method 2000 (excluding optional block 2100) above may be performed separately on each table 30, 32, 34, and 36 of the example relational database of FIGS. 1-5 to create a data structure 1000 depicted in FIG. 19. For ease of illustration, only the first rows of each of the tables 30, 32, 34, and 36 will be discussed and depicted in the figures.

Figure 19:
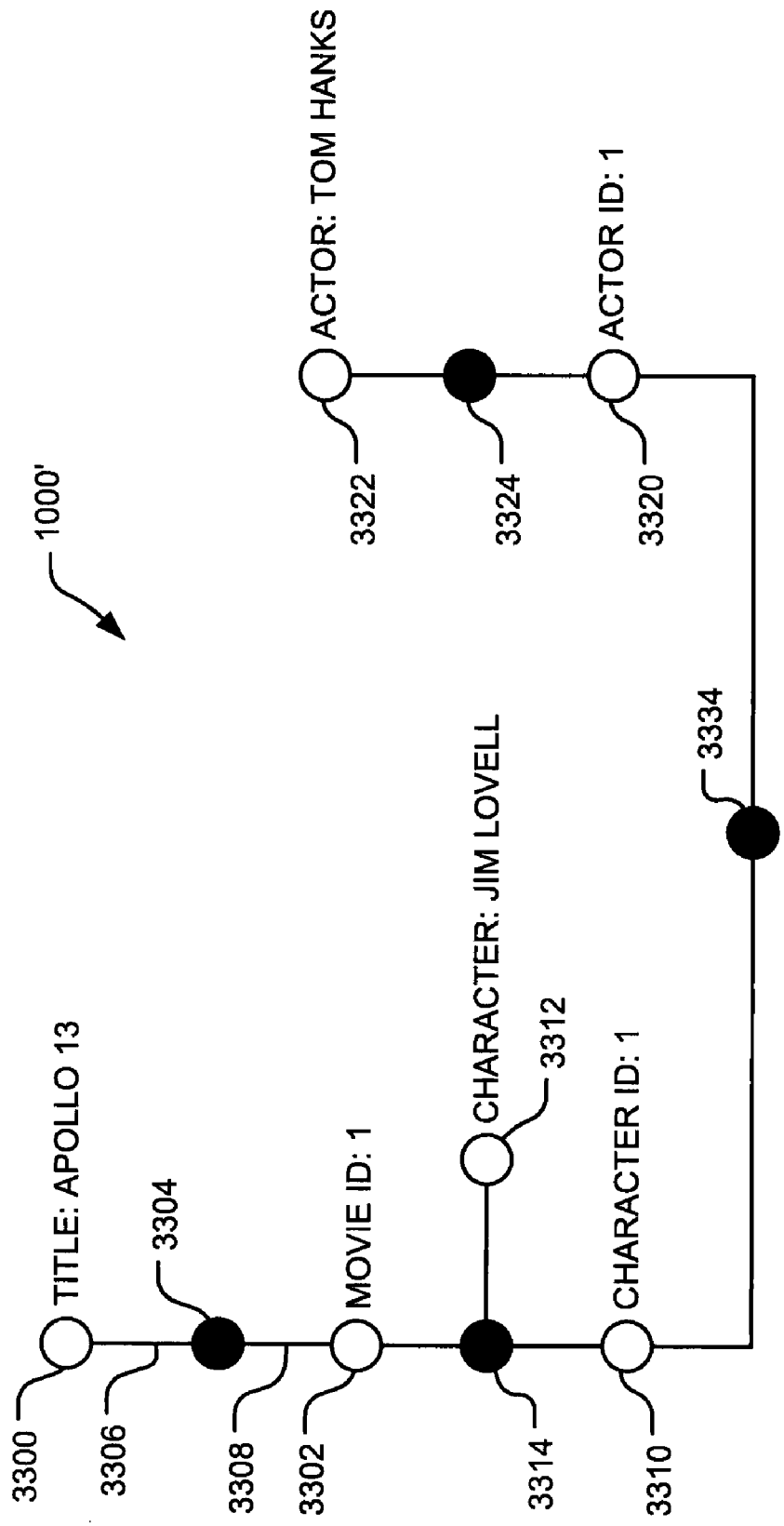
FIG. 19 is a block diagram illustrating an alternate embodiment of a data structure of a database system.

Referring to FIG. 19, starting with the table 30, in block 2110, the method 2000 would create a data node 3300 for the type/value pair "TITLE: Apollo 13" and a data node 3302 for the type/value pair "MOVIE ID: 1." Then, in block 2120, the method 2000 would create a context node 3304 and link it to the data node 3300 with a link 3306 and to the data node 3302 with a link 3308. The decision in decision block 2130 would be "NO," because as discussed above, this example is considering only the first row of each table 30, 32, 34, and 36. Then, the method 2000 would terminate with respect to table 30. In the table 3200 (see FIG. 18), the type "MOVIE ID" would be identified as a bridge type and the type "TITLE" would not be identified as a bridge type.

After the method 2000 has been performed on the first row of each of tables 30, 32, 34, and 36, the data structure 1000' of FIG. 19 would be created. Specifically, performing the method 2000 on the table 32 would add data nodes 3310 and 3312 to the data structure 1000'. These data nodes are connected to one another by a context node 3314. Performing the method 2000 on the table 34 would add data nodes 3320 and 3322 to the data structure 1000'. These data nodes are connected to one another by a context node 3324. Finally, performing the method 2000 on the table 36 would add context node 3334 to the data structure 1000' to connect data nodes 3320 and 3310. In the table 3200 (see FIG. 18), the types "CHARACTER ID" and "ACTOR ID" would each be identified as a bridge type and the types "CHARACTER," and "ACTOR" would be identified as not being bridge types.

A node having a type/value pair that includes a bridge type likely does not store any information itself other than to link two fields together. For example, the data nodes 3320, 3310, and 3302 simply connect three context nodes together and provide the mapping from the type/value pair "ACTOR: Tom Hanks" to the type/value pair "TITLE: Apollo 13." The data nodes 3320, 3310, and 3302 store no information themselves. The data nodes 3320, 3310, and 3302 may be referred to as a "type bridge" or bridge type nodes that clearly illustrate the direct relationship of the data node 3300 (i.e., the type/value pair "TITLE: Apollo 13") and the data node 3322 (i.e., the type/value pair "ACTOR: Tom Hanks"). This structure may be a more understandable form for analysis by users.

For the purposes of performing analysis on the data structure 1000', the data nodes 3320, 3310, and 3302 may be ignored or skipped when the data structure 1000' is analyzed or traversed because the user is not interested in the arbitrary values assigned to the relationships between rows represented by the bridge types. In other words, when a query is performed on the data structure 1000', only data nodes that are not bridge type nodes may be included in the query results. The table 3200 may be used to identify which data nodes may be skipped based on the value of field "BRIDGE" for their type (e.g., types "MOVIE ID," "CHARACTER ID," and "ACTOR ID" are bridge types that do not include information beyond defining relationships between the tables within the relational database).

Further, the data nodes 3302, 3320, and 3310 and the context nodes 3324, 3304, 3314, and 3334 may be treated as or aggregated into a single context node. To simplify the data structure 1000', after the data structure 1000' is created, a process may be performed on the data structure 1000' that identifies data nodes like data nodes 3302, 3320 and 3310 that merely provide a connection between two foreign keys within the relational database and for each data node identified, aggregates the data node with two or more context nodes connected thereto into a single context node.

When stored within a relational database system, the data structure 1000 may leverage indexing procedures, storage procedures, physical storage layout, caching capabilities, and transactional behavior available within the relational database system to store, update, and analyze the data stored within the data structure 1000. This allows for efficient storage, while also permitting efficient analysis. For example, an index on the field "CONTEXT NODE ID" of the table 3100 may be included to reduce the search time required to locate all data nodes linked to a particular context node. For example, the technology described herein may also leverage permanent materialized views to expedite the retrieval and caching of analysis results.

A search may be conducted on the table 3000 to locate the NODE ID value of the data node storing the type/value pair of "MOVIE: Apollo 13," i.e., 1010. Using this NODE ID value, all of the context nodes linked to data node 1010 may be found by querying table 3100 for NODE ID equal to "1010." Then, all data nodes linked to these context nodes may be found by querying table 3100 for all rows including the context nodes. The contents of the data nodes (i.e., the type/value pairs) may be extracted by querying the table 3000 for the "NODE ID" values stored in the rows located.

Alternatively, software modules including computer executable instructions may be used to extract the source data from the tables 3000 and 3100 and construct a graph-like structure similar to the one depicted in FIG. 11. The custom procedures may define two types of nodes, a data node and a context node. The data nodes may simply be blocks of memory. The context nodes may include a dynamic array of pointers, one for each data node linked to the context node. In various embodiments, the data nodes may include an array of pointers having a pointer to each context node linked to the data node.

Alternatively, the data structure 1000 may be incorporated into a database system that provides sophisticated caching mechanisms to improve locality or to move analysis processes up into memory. In various embodiments, portions of a multi-dimensional data hypercube may be created using permanent materialized views. In further embodiments, the database system may be implemented as a fully in-memory database of the type typically used to explore graph traversal technology.

In alternate embodiments, the table 3100 of FIG. 17 may be strictly denormalized. For example, the context layer table 3100 may be joined against itself until each row contains all of permutations of node combinations. This may assist with locality for persistable storage of the data (when traversing across tables stored on physical disk), however it may also increase the storage requirements. For example, the first three rows of table 3100 would be represented by a table 3340 of FIG. 20. While this implementation may not be scalable in all cases, it may be useful with respect to certain subsets of nodes, increasing performance at the cost of increased utilization of disk space. In some embodiments, this de-normalization technique may necessitate complex and time-consuming import operations.

As mentioned previously, queries may be performed on the data nodes of the data structure 1000. For example, a multidimensional data slice, such as a multidimensional hypercube of data, may be selected from the data structure 1000 using the relationship of the context nodes to the data nodes. Locating a particular data node (e.g., the data node 1010) in the data structure 1000 is similar to taking a multidimensional slice of a multidimensional database (see FIG. 9). All of the context nodes (e.g., the context nodes 1040, 1080, 1090, and 1096) that link to the particular data node (e.g., the data node 1010) are part of the multidimensional slice along a hyper-plane. For illustrative purposes the data of the following two tables, Table A and Table B, are provided.

TABLE A

| Movie Title | Length (Min) |
|---|---|
| A | 128 |
| B | 144 |

TABLE B

| Movie Title | Actor |
|---|---|
| A | Joe |
| A | Bob |
| B | Stan |
| B | Joe |

Figure 21:
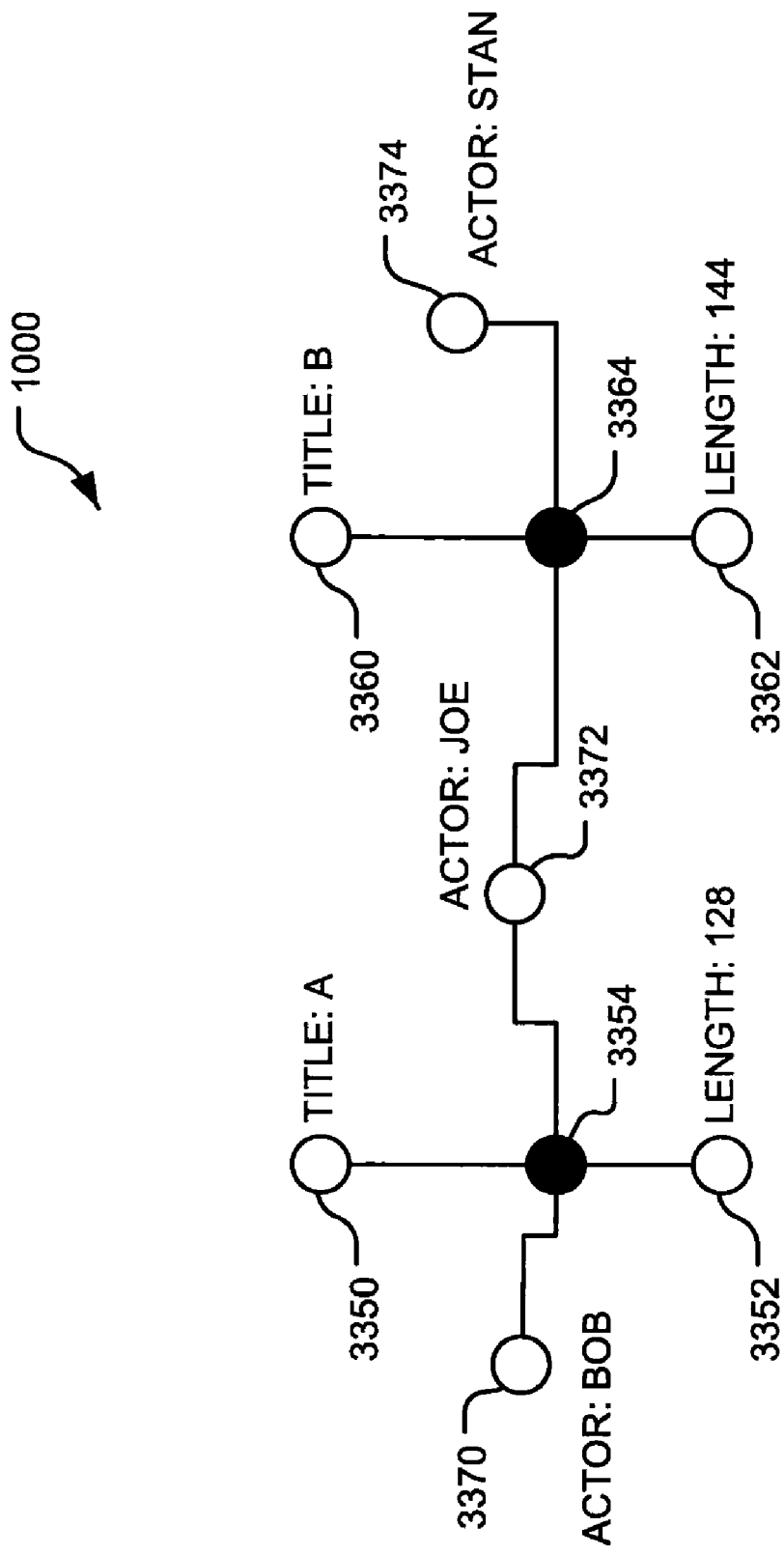
FIG. 21 is a block diagram illustrating the data structure of FIG. 11 storing different data.

Referring to FIG. 21, the data structure 1000 is depicted storing the data of Tables A and B (above). The average length of movies in which the actor "Joe" was involved may be found by identifying all of the context nodes linked to the data node 3372, which corresponds to the actor "Joe" in the data structure 1000. In this example, context nodes 3354 and 3364 are linked to the data node 3372.

The context node 3354 is linked to a data node 3350, which corresponds to the movie title "A." The context node 3354 is also linked to a data node 3352, which corresponds to the length "128." Therefore, the inference is drawn that the movie title "A" is 128 minutes in length.

The context node 3364 is linked to a data node 3360, which corresponds to the movie title "B." The context node 3364 is also linked to a data node 3362, which corresponds to the length "144." Therefore, the inference is drawn that the movie title "B" is 144 minutes in length.

Because the data node 3372, which corresponds to the actor "Joe" is linked to both the data node 3350 and the data node 3360, the lengths 128 and 144 are both associated with the actor "Joe." Statistical analysis, such as the average mentioned above, may be performed on these numerical values associated with the actor "Joe." In a similar manner, any statistical measure can be easily computed using the values of the length (e.g., 128 and 144) of the movie titles in which any actor was involved.

As is apparent to those of ordinary skill in the art, the multidimensional data slice may include any number of dimensions. Further, the multidimensional data slice may be used to create a hypercube representation of the query results. In the above example, the multidimensional data slice had three dimensions, actor, movie title, and length. The dimensions actor and movie title may be illustrated as axes of a two-dimensional plane or table, with the length values depicted at the intersections of the actor and movie title dimensions. If any dimension within a particular multidimensional slice is numeric, the data within that dimension may be aggregated. In the above example, the numeric data (length) was aggregated for a particular actor (in the actor dimension) across all values of the movie title dimension. Any statistical measurement, such as summation, determination of the mean, median, mode, maximum, minimum, standard deviation, variance, and the like, may be applied to the numeric dimension within the multidimensional data slice.

The data structure 1000 can be made available for analysis and use a variety of ways and in a variety of formats. For example, the data structure 1000 may be made available to a user via a published API, and the like. The data structure 1000 may reside on a server. Access to the data structure 1000 may be provided as a service in accordance with a service contract.

Various controller layers configured to provide specialized analytics procedures may be added to the data structure 1000. For example, the data structure 1000 may be configured to provide dynamic query logging. Dynamic query logging may be characterized as an auditing mechanism applied to the data structure 1000. As different events occur, such as the execution of query, execution of analysis, and the like, these events may be recorded in the data structure 1000. For example, each time a query is executed, the query may be logged in the data structure 1000 by adding new entities and links to the data structure 1000.

Figure 22:
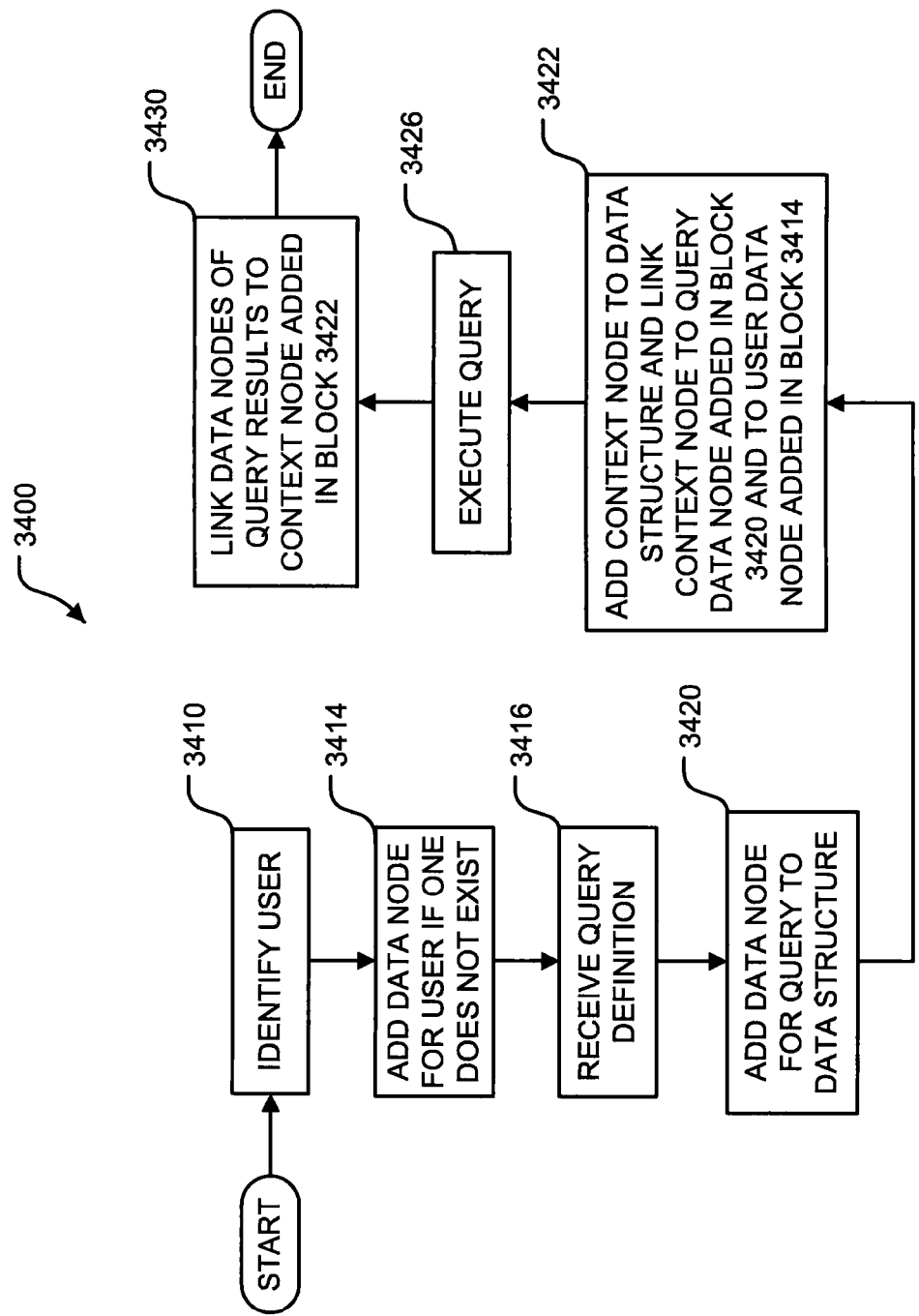
FIG. 22 is a block diagram illustrating a method of performing dynamic query logging using the data structure of FIG. 11.

A method 3400 of performing dynamic query logging using the data structure 1000 is provided in FIG. 22. In first block 3410, the user is identified. As is apparent to those of ordinary skill in the art, to execute a query on the data structure 1000, the user accesses the data structure 1000 via a published API, a server, a service, and the like. When accessing the data structure 1000, the user may provide some identifying information. For example, the user may be required to logon to the server, provide account identification information (e.g., an account identifier) to the service, provide a user identifier to the API, and the like. Further, the user may automatically provide identifying information, such as his/her IP address if accessing the data structure 1000 over an IP network. For ease of illustration, it is assumed that the user has provided identifying information and in the block 3410, the method 3400 identifies the user as entity "X."

Figure 23:
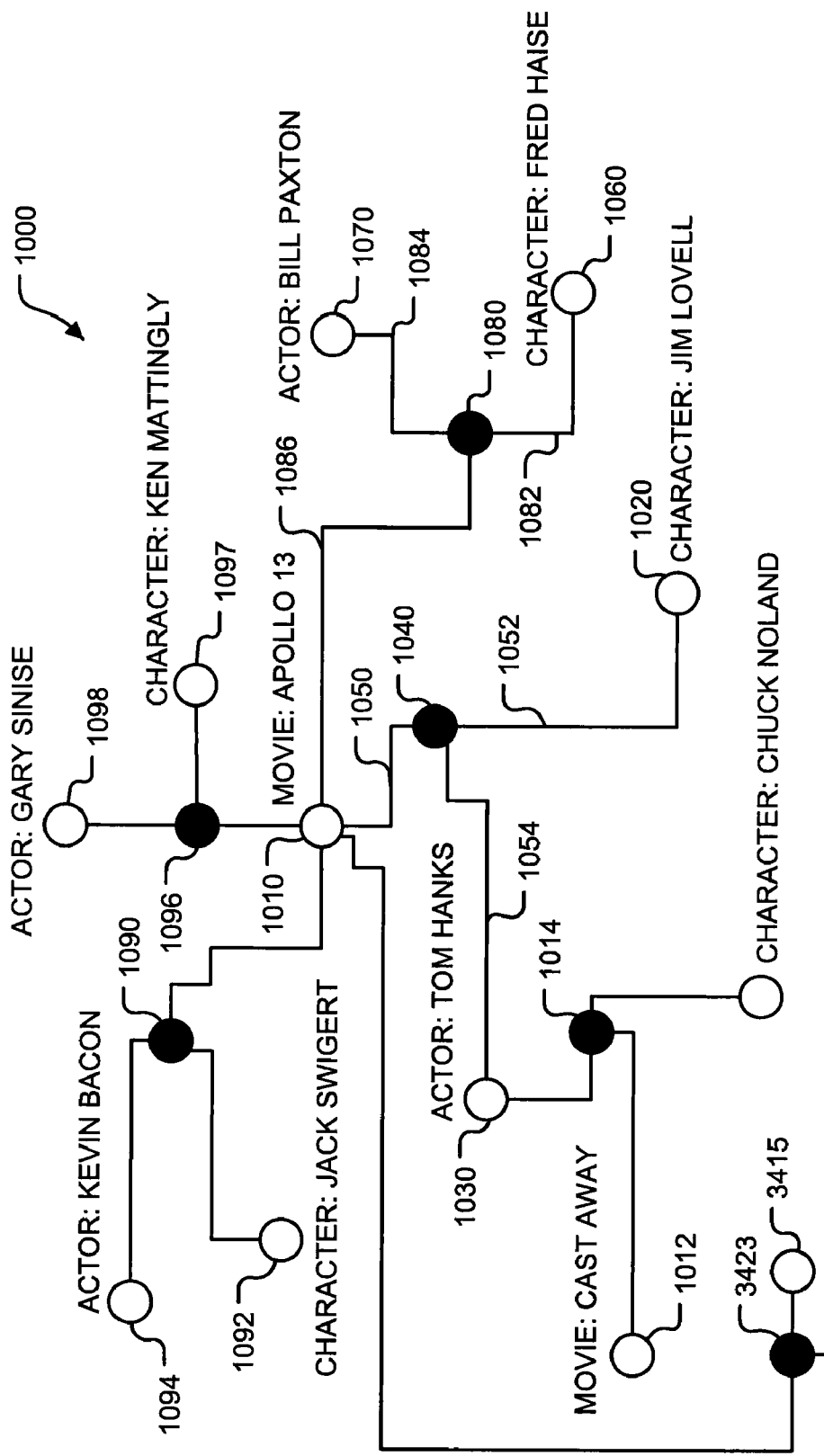
FIG. 23 is a block diagram illustrating the data structure of FIG. 11 after the performance of the method of FIG. 22.

In next block 3414, as may be viewed in FIG. 23, a data node 3415 is added to the data structure 1000 for entity "X," if one does not exist. The data node 3415 may be described as an entity node. By way of a non-limiting example, the data node 3415 added to the data structure 1000 for entity "X" has a type/value pair "USER IDENTIFIER: X." However, if a data node having the type/value pair "USER IDENTIFIER: X" already exists, the new data node 3415 is not added to the data structure 1000.

In block 3416, the method 3400 receives a query definition from the user. The user may define the query using any method known in the art and the present teachings are not limited to any particular method. For illustrative purposes, it is assumed the user has identified a query that is searching the data structure 1000 for any movies in which both Tom Hanks and Bill Paxton were both actors.

Then, in block 3420, a data node 3421 (see FIG. 23) is added for the query if one does not already exist. The data node 3421 may be described as a query node. By way of a non-limiting example, the data node 3421 added to the data structure 1000 for the query may have a type/value pair that identifies the time at which the query was received, executed, terminated, and the like. For example, the data node 3421 may have a type/value pair "TIME STAMP: 04/10/08 8:15:36 AM."

Then, in block 3422, a context node 3423 is created and linked to both the data node 3415 (having the type/value pair "USER IDENTIFIER: X") and the data node 3421 (having the type/value pair "TIME STAMP: 04/10/08 8:15:36 AM"). In other words, in block 3422, the context node 3423 links the entity node (data node 3415) to the query node (data node 3421).

Next, in block 3426, the query definition received in block 3416 is executed on the data structure 1000. In block 3430, any data nodes identified in the query results are linked to the context node 3423. In the present example, Tom Hanks and Bill Paxton were actors in only the movie "Apollo 13." Therefore, the data node 1010 (having the type/value pair "MOVIE: APOLLO 13") is linked to the context node 3423.

The method 3400 provides automatic query logging which enables analysis, such as query auditing, of the queries performed on the data structure 1000. For example, all data nodes having the type "USER IDENTIFIER" (i.e., all entity nodes) can be analyzed and intersections identified. Further, user collaboration utilities may be applied to the data structure 1000 allowing for tacit collaboration. By way of a non-limiting example, all of the users who have searched for a particular data node may be readily identified by locating any data nodes having either the type "USER IDENTIFIER" or the type "TIME STAMP" that are coupled by a single context node to the particular data node of interest. Further, this method may be used to identify users who are searching for similar entities.

For example, a set of entity nodes may be identified. Then, context nodes linked to each of entity nodes may be identified. Any data nodes (other than the entity nodes) connected to each of the context nodes defines a result set of nodes associated with both the context node and the entity node linked to the context node. Finally, the result set of nodes associated with each entity node may be analyzed.

By way of another non-limiting example, the analysis may include identifying one or more entity nodes associated with result sets of nodes that include the same data node. By way of other non-limiting examples, the analysis may include identifying a data node in the result set of nodes associated with at least a threshold number of entity nodes, the largest number of entity nodes, the smallest number of entity nodes, and the like. By way of another non-limiting example, the analysis may include identifying one or more entity nodes associated with a particular data node. An identifier of the particular data node may be provided by the user and used in the analysis. For example, the identifier of the particular data node may be provided in a query definition.

The value assigned to a data node having the type "USER IDENTIFIER" does not have to be a piece of data specific to a particular user. Instead, the value could be any piece of data that can be deduced from the user, inferred from information known about the user, or otherwise associated with the user. For example, the value could be a user group, the date of the query, or any other information about the user or the query that is available. If the user group is used instead of an individual user identifier then analysis of the group of users in relationship with other groups can be performed. Further, the groups of users may be aggregated to perform population level analysis. Additionally, query patterns of multiple groups of users may be studied. These types of analysis may be used to identify groups or individuals for the purposes of collaboration. In other words, groups and individuals who share a common interest in one or more portions of the data structure 1000 may be identified.

Analysis using query date (e.g., all or a portion of the value of the data nodes having the type "TIME STAMP") can be used to track the popularity of certain data nodes over time. Further, queries having dates older than a predetermined threshold can be ignored, the context nodes and data nodes specific thereto removed from the data structure 1000, and the like.

As is apparent to those of ordinary skill in the art, the data structure 1000 may be described as a graph consisting of a set of vertices "V" and a set of edges "E." Referring to FIG. 11, examples of edges with the set of edges "E" include the links 1050, 1052, 1054, 1082, and 1086. The set of vertices "V" includes the data nodes (e.g., data nodes 1010, 1012, 1020, 1030, 1060, 1070, 1092, 1094, 1097, and 1098) that are collectively referred to as a set of data nodes "$V_D$" and the context nodes, (e.g., context nodes 1014, 1040, 1080, 1090, and 1096) that are collectively referred to as a set of context nodes "$V_C$." The set of edges "E" includes only edges that connect a vertex in the set of data nodes "$V_D$" to a vertex in the set of context nodes "$V_C$." None of edges within the set of edges "E" connects any two of the vertices within the set of data nodes "$V_D$." Further, none of the edges within the set of edges "E" connects any two vertices within the set of context nodes "$V_C$."

The data structure 1000 (see FIG. 11) may be modified to include one or more additional sets of nodes. Each node of these new sets of nodes functions as a vertex within the set of vertices "V." In other words, in addition to the set of data nodes "$V_D$" and set of context nodes "$V_C$," the set of vertices "V" may include the one or more additional sets of nodes, such as sets of nodes $V_E, V_F, V_G, \ldots V_N$. One or more of the sets of vertices may be configured to represent data (e.g., meta-data) related to the data nodes within the set of data nodes "$V_D$." One or more of the sets of vertices may be configured to represent data related to the context nodes within the set of context nodes "$V_C$."

Figure 24:
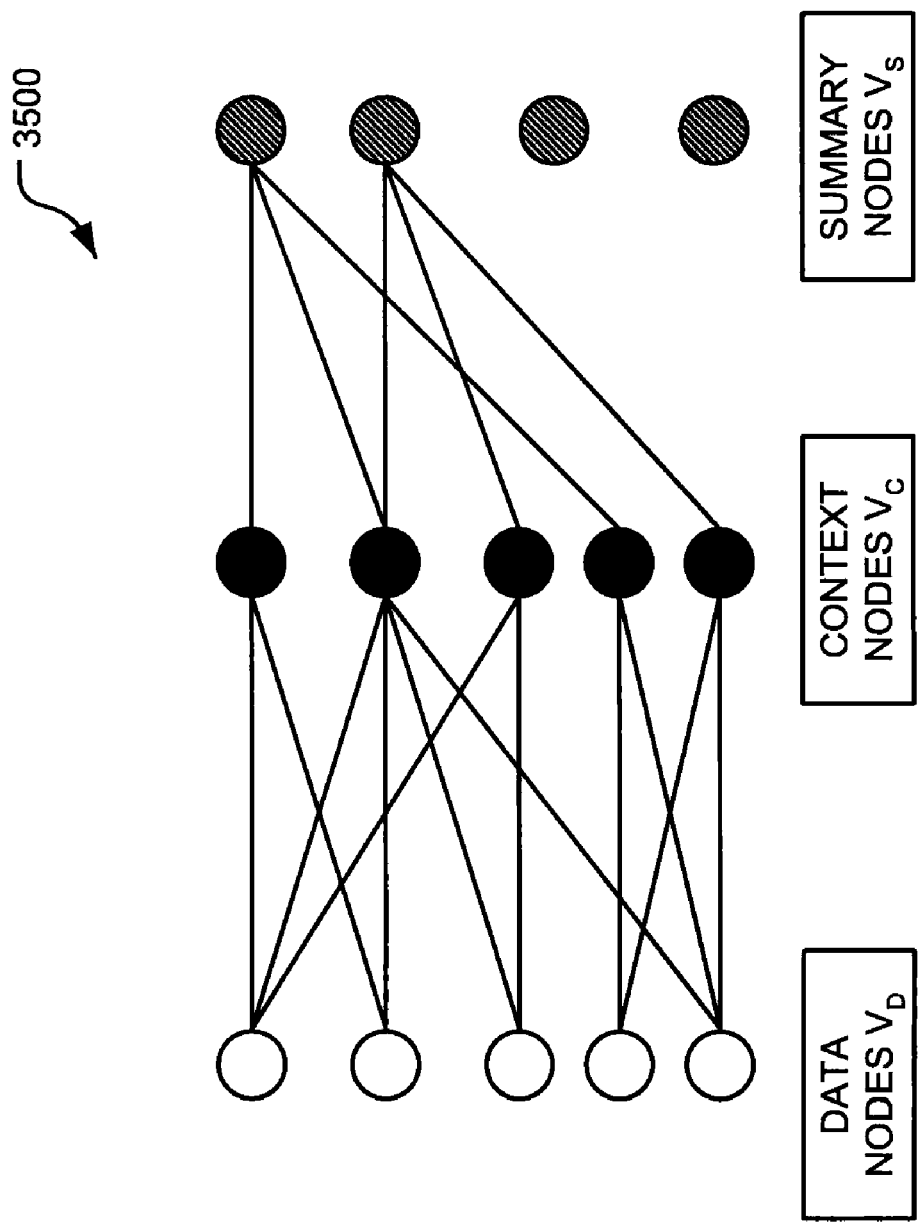
FIG. 24 is a block diagram illustrating an alternate embodiment of a data structure configured to store a plurality of summary nodes in addition to a plurality of data nodes and a plurality of context nodes.

Referring to FIG. 24, by way of a non-limiting example, a set of summary nodes "$V_S$" could be added to the data structure 1000 to create a new data structure 3500. In FIG. 24, each of the data nodes is depicted as an empty circle, each of the context nodes is depicted as a solid black circle, and each of the summary nodes is depicted as a circle having diagonal lines within its interior portion. By way of example, each of the summary nodes within the set of summary nodes "$V_S$" may be stored in a table identical to the table 3000 (see FIG. 17) within a relational database. By way of another example, a field "SET ID" may be added to the table 3000 and each of the summary nodes within the set of summary nodes "$V_S$" may be stored the table 3000. The field "SET ID" may be used to identify to which set ("$V_S$" or "$V_D$") each node belongs.

The connections between the summary nodes within the set of summary nodes "$V_S$" and the context nodes within the set of context nodes "$V_C$" may be included in the table 3100. Specifically, each summary node within the set of summary nodes "$V_S$" may be assigned a "NODE ID" that has not been assigned to a data node of the set of data nodes "$V_D$" and if the summary node is connected to a context node, the value of the "CONTEXT NODE ID" for the context node and the value of the "NODE ID" of the summary node may be recorded in a record within the table 3100. Alternatively, a table substantially similar to the table 3100 may be added to the relational database and used to store the connections between the summary nodes within the set of summary nodes "$V_S$" and the context nodes within the set of context nodes "$V_C$."

The data structure 3500 may be described as including a plurality of layers, the number of which depends upon how many sets of nodes (e.g., the sets of nodes $V_D, V_C, V_S$, and so forth) are included in the vertices "V." The data structure 3500 depicted in FIG. 24 includes two layers. One layer includes the disjoint sets "$V_D$" and "$V_S$," and the other layer includes the set of context nodes "$V_C$."

The data structure 3500 depicted in FIG. 24 may be described as a bipartite graph having two sets of nodes. The two sets of nodes are $V_D$ and $V_{CUS}$, where $V_{CUS}$ is the union of the sets $V_C$ and $V_S$ (i.e., $V_C \cup V_S$). The only edges that exist in a bipartite graph connect one set of nodes (e.g., $V_D$) to the other set (e.g., $V_{CUS}$). Any number of layers can be added to the graph and it will maintain the properties of a bipartite graph. Algorithms that run on multilayered graphs can be optimized to run on the data structure 3500 because of the known constraints on the edges within the set of edges "E" of the graph. Specifically, it is known that the set of edges "E" connect only certain subsets of the vertices. These principles may be used to modify the data structure 3500 into an N-partite graph (e.g., a tripartite graph, 4-partite graph, and the like), as defined in graph theory. In an N-partite graph, any layer may interconnect with any number of other layers to form an abstract analysis.

By way of a non-limiting example, each of the summary nodes in the set of summary nodes "$V_S$" may identify a data source. The set of summary nodes "$V_S$" may be connected to context nodes (in the set of context nodes "$V_C$"), which are connected to the data nodes (in the set of data nodes "$V_D$"). In this manner, the data source of the information stored by each of the data nodes may be identified. While the data sources could have been added to the data structure 3500 as data nodes (in the set of data nodes "$V_D$"), a decrease in the amount of time required to perform analyses using the set of summary nodes "$V_S$" may be obtained by storing the set of summary nodes "$V_S$" in a table separate from the table used to store the set of data nodes "$V_D$."

Additional layers may be used when analyzing the graph. For example, a layer of vertices may be added to the graph that describes the level of confidence in a certain set of connections. The confidence measurements can be used when analyzing the graph to provide confidence estimates regarding any automated conclusions that are made based on the data nodes and their connections within the graph.

Figure 25:
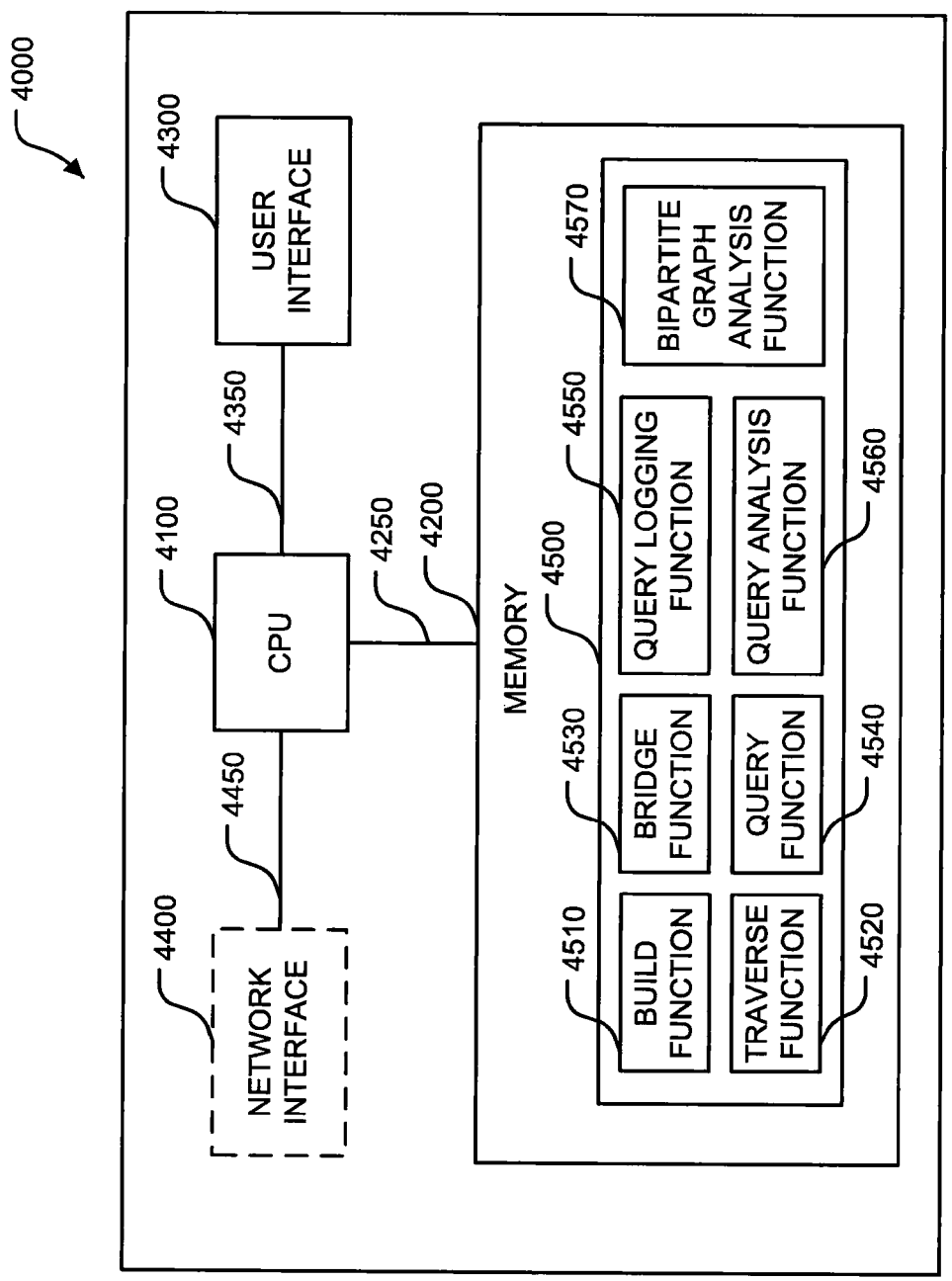
FIG. 25 is a block diagram illustrating an exemplary computing device configured to implement the data structure of FIG. 11.

FIG. 25 is a block diagram of an exemplary computing device 4000 configured to implement the data structure 1000 (see FIG. 11). As is apparent to those of ordinary skill, the functionality of the data structure 1000 may be implemented using a single computing device 4000 or distributed across several computing devices having substantially the same functionality as the computing device 4000.

The computing device 4000 may include a programmable central processing unit (CPU) 4100 which may be implemented by any known technology, such as a microprocessor, microcontroller, application-specific integrated circuit (ASIC), digital signal processor (DSP), or the like. The CPU 4100 may be integrated into an electrical circuit, such as a conventional circuit board, that supplies power to the CPU 4100. The CPU 4100 may include internal memory or memory 4200 may be coupled thereto. The memory 4200 is a computer readable medium that includes instructions or computer executable components that are executed by the CPU 4100. The memory 4200 may be coupled to the CPU 4100 by an internal bus 4250.

The memory 4200 may comprise random access memory (RAM) and read-only memory (ROM). The memory 4200 contains instructions and data that control the operation of the CPU 4100. The memory 4200 may also include a basic input/output system (BIOS), which contains the basic routines that help transfer information between elements within the computing device 4000. The present invention is not limited by the specific hardware component(s) used to implement the CPU 4100 or memory 4200 components of the computing device 4000.

Optionally, the memory 4200 may include internal and/or external memory devices such as hard disk drives, floppy disk drives, and optical storage devices (e.g., CD-ROM, R/W CD-ROM, DVD, and the like). The computing device 4000 may also include one or more I/O interfaces (not shown) such as a serial interface (e.g., RS-232, RS-432, and the like), an IEEE-488 interface, a universal serial bus (USB) interface, a parallel interface, and the like, for the communication with removable memory devices such as flash memory drives, external floppy disk drives, and the like.

The computing device 4000 may also include a user interface 4300 having a computing display, such as a standard computer monitor, LCD, or other visual display. In some embodiments, a display driver may provide an interface between the CPU 4100 and the user interface 4300. The user interface 4300 may include an input device, such as a standard keyboard, mouse, track ball, buttons, touch sensitive screen, wireless user input device, and the like. The user interface 4300 may be coupled to the CPU 4100 by an internal bus 4350.

The computing device 4000 may also include an optional network interface 4400 configured to couple the computing device 4000 to a network (not shown), such as a LAN, WAN, the Internet, and the like. The network interface 4400 may be coupled to the CPU 4100 by an internal bus 4450.

The various components of the computing device 4000 may be coupled together by the internal buses 4250, 4350, and 4450. Each of the internal buses 4250, 4350, and 4450 may be constructed using a data bus, control bus, power bus, I/O bus, and the like.

In various embodiments, computer executable instructions 4500 implementing the data structure 1000, the data structure 1000', and/or the data structure 3500 reside in the memory 4200 as illustrated in FIG. 25. The computer executable instructions 4500 may include instructions implementing the tables storing the data structure 1000, the data structure 1000', and/or the data structure 3500, indexes on those tables, queries with respect to the tables, and analysis of the data residing in those tables including instructions for constructing and performing analysis on a graph-like data structure constructed from the tables. The instructions 4500 may also include instructions implementing other aspects of a relational database system including instructions for effecting storage and retrieval of the data residing in the tables. The instructions 4500 include components for implementing the method 2000 of FIG. 12 and/or the method 3400 of FIG. 22.

The instructions 4500 include components for implementing the various functions described above. For example, the instructions 4500 include a build function 4510 that constructs the data structure 1000, the data structure 1000', and/or the data structure 3500. By way of a non-limiting example, the build function 4510 may perform the method 2000 of FIG. 12.

The instructions 4500 include a traverse function 4520 configured to identify one or more starting nodes and traverse the links connected thereto to other nodes of the data structure 1000, the data structure 1000', and/or the data structure 3500. The traverse function 4520 may return the type/value pairs of at least a portion of the data nodes traversed. Further, the traverse function 4520 may return identifiers of at least a portion of the data nodes traversed. The traverse function 4520 may use the one or more indexes described above to traverse the appropriate data structure(s). The starting nodes may be selected by the user and provided to the traverse function 4520 using the user interface 4300. Methods of traversing a data structure having a plurality of linked nodes are well known in the art and any suitable method may be implemented by the traverse function 4520. The traverse function 4520 is not limited to any particular method of traversing the data structure 1000, the data structure 1000', and/or the data structure 3500.

The instructions 4500 include a bridge function 4530 that is configured to ignore any data nodes having a bridge type. Alternatively, the bridge function 4530 may aggregate a bridge type node with any context nodes linked to the bridge type node. Further, the bridge function 4530 may allow the user to specify which types in the table 3200 are bridge types. The traverse function 4520 may use the bridge function 4530 to skip bridge type nodes.

The instructions 4500 include a query function 4540 configured to receive a query definition from a user via the user interface 4300 or from another function of the system. The query function 4540 then executes the query defined by the query definition on the data structure 1000, the data structure 1000', and/or the data structure 3500. The query function 4540 may be used to traverse the data structure 1000, the data structure 1000', and/or the data structure 3500 and identify a result set of data nodes satisfying the parameters of the query definition. The query function 4540 may use the traverse function 4520 to traverse the appropriate data structure(s). The query function 4540 may use the bridge function 4530 to avoid including bridge type nodes in the result set of data nodes. The query function 4540 may aggregated the values of any data nodes that are numeric. Any of the statistical analysis, such as summation, determination of the mean, median, mode, maximum, minimum, standard deviation, variance, and the like, discussed above with respect to FIG. 21 may be implemented by the query function 4540.

The instructions 4500 include a query logging function 4550 configured to receive a query definition from an entity and determine an identification for the entity. The query logging function 4550 may execute the method 3400 described above. The query logging function 4550 creates a data node for the entity, a data node for the query, and a new context node. The new context node is linked by the query logging function 4550 to both the data node for the entity and the data node for the query. Then, the query logging function 4550 uses the query function 4540 to execute the query on the appropriate data structure(s). After the query results are returned by the query function 4540, the query logging function 4550 links the new context node to at least a portion of the plurality of data nodes identified by the query function 4540.

The instructions 4500 include a query analysis function 4560 that analyzes the queries logged by the query logging function 4550. The query analysis function 4560 may identify at least a portion of the data nodes that were created for entities by multiple executions of the query logging function 4550. This portion of the data nodes define a set of entity nodes. For each entity node identified, the query analysis function 4560 identifies any context nodes linked to the entity node. Then, for each context node identified, the query analysis function 4560 identifies any data nodes (other than the entity nodes) connected to the context node. These data nodes define a result set of nodes associated with the context node and the entity node linked to the context node. Finally, the query analysis function 4560 analyzes the result set of nodes associated with at least a portion of the entity nodes in the set of entity nodes. This analysis may include any of the types of analyses described above with respect to dynamic query logging.

The instructions 4500 include a bipartite graph analysis function 4570 configured to analyze the data nodes as a first set of nodes of a bipartite graph and a union of the context nodes and the summary nodes as a second set of nodes of the bipartite graph.

In alternate embodiments, the instructions 4500 may reside in a memory of one more computing devices having substantially the same functionality as the computing device 4000.

While the functions 4510, 4520, 4530, 4540, 4550, 4560, and 4570 have been described as being implemented by the instructions 4500, those of ordinary skill in the art recognize that one or more of these functions or portions thereof may be implemented using hardware and such implementations are within the scope of the present teachings.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A database system storing a data structure comprising:
a plurality of data nodes, each data node storing data comprising a type and a value, none of the data nodes of the plurality of data nodes being linked directly to another data node of the plurality of data nodes;
a plurality of context nodes, each context node being linked by a separate link to at least two data nodes of the plurality of data nodes, and storing no data, the context node indicating a relationship exists between the at least two data nodes to which the context node is linked;
a data layer table configured to store the type and the value of the data of each of the plurality of data nodes and a data node identifier for each of the plurality of data nodes;
a context layer table configured to store a record for each link between a context node of the plurality of context nodes and a data node of the plurality of data nodes, the record comprising the data node identifier of the data node and a context node identifier for the context node;
a type table configured to store a plurality of valid types, the type stored by each of the plurality of data nodes being one of the plurality of valid types, the type table being further configured to store a bridge type indicator for each of the plurality of valid types, the bridge type indicator being configured to indicate whether the type is a bridge type; and
a bridge function configured to ignore any data nodes of the plurality of data nodes storing a type that in the type table, is associated with a bridge type indicator that indicates the type is a bridge type.

2. The system of claim 1, wherein the data stored in the plurality of data nodes comprise a plurality of types, and the system further comprises an index for at least a portion of the plurality of types of the data stored in the plurality of data nodes.

3. The system of claim 1, further comprising an index for at least a portion of the plurality of context nodes, the index being configured to facilitate traversal from the plurality of context nodes to the plurality of data nodes.

4. The system of claim 1, further comprising an index for at least a portion of the plurality of context nodes, the index being configured to facilitate traversal from the plurality of data nodes to the plurality of context nodes.

5. The system of claim 1, further comprising a query function configured to receive a query definition and use the query definition to identify a portion of the plurality of data nodes within the data structure.

6. The system of claim 1, further comprising:
a traverse function configured to traverse the linked data nodes and context nodes of the data structure, and return the type/value pair of at least a portion of the data nodes traversed.

7. A database system storing a data structure comprising:
a plurality of data nodes, each data node storing data comprising a type and a value, none of the data nodes of the plurality of data nodes being linked directly to another data node of the plurality of data nodes;
a plurality of context nodes, each context node being linked by a separate link to at least two data nodes of the plurality of data nodes, and storing no data, the context node indicating a relationship exists between the at least two data nodes to which the context node is linked;

a data layer table configured to store the type and the value of the data of each of the plurality of data nodes and a data node identifier for each of the plurality of data nodes;

a context layer table configured to store a record for each link between a context node of the plurality of context nodes and a data node of the plurality of data nodes, the record comprising the data node identifier of the data node and a context node identifier for the context node;

a type table configured to store a plurality of valid types, the type stored by each of the plurality of data nodes being one of the plurality of valid types, the type table being further configured to store a bridge type indicator for each of the plurality of valid types, the bridge type indicator being configured to indicate whether the type is a bridge type; and a bridge function configured to aggregate each data node of the plurality of data nodes that stores a type that in the type table, is associated with a bridge type indicator that indicates the type is a bridge type with any context nodes of the plurality of context nodes linked to the data node.

8. The system of claim 7, wherein the data stored in the plurality of data nodes comprise a plurality of types, and the system further comprises an index for at least a portion of the plurality of types of the data stored in the plurality of data nodes.

9. The system of claim 7, further comprising an index for at least a portion of the plurality of context nodes, the index being configured to facilitate traversal from the plurality of context nodes to the plurality of data nodes.

10. The system of claim 7, further comprising an index for at least a portion of the plurality of context nodes, the index being configured to facilitate traversal from the plurality of data nodes to the plurality of context nodes.

11. The system of claim 7, further comprising a query function configured to receive a query definition and use the query definition to identify a portion of the plurality of data nodes within the data structure.

12. The system of claim 7, further comprising:

a traverse function configured to traverse the linked data nodes and context nodes of the data structure, and return the type/value pair of at least a portion of the data nodes traversed.

13. A database system storing a data structure comprising:

a plurality of data nodes, each data node storing data comprising a type and a value none of the data nodes of the plurality of data nodes being linked directly to another data node of the plurality of data nodes;

a plurality of context nodes, each context node being linked to at least two data nodes of the plurality of data nodes, and storing no data, the context node indicating a relationship exists between the at least two data nodes to which the context node is linked; and a plurality of summary nodes, each summary node storing data comprising a type and a value, none of the summary nodes of the plurality of summary nodes being linked directly to another summary node of the plurality of summary nodes, each of the plurality of summary nodes being linked to at least one of the plurality of context nodes, the at least one context node indicating a relationship exits between the summary node and the at least two data nodes to which the context node is linked.

14. The system of claim 13, further comprising:

a bipartite graph analysis function configured to analyze the plurality of data nodes as a first set of nodes of a bipartite graph and a union of the plurality of context nodes and the plurality of summary nodes as a second set of nodes of the bipartite graph.

15. The system of claim 13, wherein the data stored in the plurality of data nodes comprise a plurality of types, and the system further comprises an index for at least a portion of the plurality of types of the data stored in the plurality of data nodes.

16. The system of claim 13, further comprising an index for at least a portion of the plurality of context nodes, the index being configured to facilitate traversal from the plurality of context nodes to the plurality of data nodes.

17. The system of claim 13, further comprising an index for at least a portion of the plurality of context nodes, the index being configured to facilitate traversal from the plurality of data nodes to the plurality of context nodes.

18. The system of claim 13, further comprising a query function configured to receive a query definition and use the query definition to identify a portion of the plurality of data nodes within the data structure.

19. The system of claim 13, further comprising:

a traverse function configured to traverse the linked data nodes and context nodes of the data structure, and return the type/value pair of at least a portion of the data nodes traversed.

20. A database system storing a data structure comprising:

a plurality of data nodes, each data node storing data comprising a type and a value, none of the data nodes of the plurality of data nodes being linked directly to another data node of the plurality of data nodes;

a plurality of context nodes, each context node being linked to at least two data nodes of the plurality of data nodes, and storing no data, the context node indicating a relationship exists between the at least two data nodes to which the context node is linked; and a query logging function configured to:

receive a query definition from an entity, the query definition defining a query configured to be executed on the data structure, and when executed, to identify at least a portion of the plurality of data nodes, create a data node for the entity, create a data node for the query, create a new context node, link the new context node to both the data node for the entity and the data node for the query, execute the query on the data structure, and link the new context node to a portion of the plurality of data nodes identified by the query.

21. The system of claim 20, wherein the query logging function has received a plurality of query definitions from a plurality of entities, created a plurality of data nodes for the plurality of entities, and created a plurality of data nodes for a plurality of queries defined by the plurality of query definitions, the system further comprising a query analysis function configured to:

identify at least a portion of the data nodes that were created for plurality of entities, the data nodes identified defining a set of entity nodes, for each data node in the set of entity nodes, identify at least one context node connected the data node, for the at least one context node identified for each data node in the set of entity nodes, identify any data nodes other than the data nodes in the set of entity nodes connected to the at least one context node, the data nodes identified defining a result set of nodes associated with the data node in the set of entity nodes, and analyze the result set of nodes associated with at least a portion of the data nodes in the set of entity nodes.

22. The system of claim 21, wherein the analysis of the result set of nodes associated with at least the portion of the data nodes in the set of entity nodes comprises an identification of one or more data nodes in the set of entity nodes associated result sets of nodes including the same data node.

23. The system of claim 21, wherein the analysis of the result set of nodes associated with at least the portion of the data nodes in the set of entity nodes comprises an identification of a data node in the result set of nodes associated with a largest number of data nodes in the set of entity nodes.

24. The system of claim 21, wherein the analysis of the result set of nodes associated with at least the portion of the data nodes in the set of entity nodes comprises an identification of a data node in the result set of nodes associated with a smallest number of data nodes in the set of entity nodes.

25. The system of claim 21, wherein the analysis of the result set of nodes associated with at least the portion of the data nodes in the set of entity nodes comprises an identification of one or more data nodes in the set of entity nodes associated with a selected data node in the result set of nodes, the query analysis function being further configured to receive an identification of the selected data node.

26. The system of claim 20, wherein the data stored in the plurality of data nodes comprise a plurality of types, and the system further comprises an index for at least a portion of the plurality of types of the data stored in the plurality of data nodes.

27. The system of claim 20, further comprising an index for at least a portion of the plurality of context nodes, the index being configured to facilitate traversal from the plurality of context nodes to the plurality of data nodes.

28. The system of claim 20, further comprising an index for at least a portion of the plurality of context nodes, the index being configured to facilitate traversal from the plurality of data nodes to the plurality of context nodes.

29. The system of claim 20, further comprising:
a traverse function configured to traverse the linked data nodes and context nodes of the data structure, and return the type/value pair of at least a portion of the data nodes traversed.

30. A method of constructing a data structure for storing data, the method comprising:
obtaining structured data comprising a plurality of pieces of data, each piece of data comprising a type and a value, the type and value together defining a type/value pair, the structured data further comprising a plurality of relationships between the ones of the plurality of pieces of data, each of the plurality of relationships identifying related pieces of data within the plurality of pieces of data;
identifying a portion of the plurality of pieces of data wherein each piece of data has a unique type/value pair within the plurality of pieces of data;
for each piece of data of the portion of the pieces of data identified, creating a data node thereby creating a plurality of data nodes;
defining a plurality of sets of related data nodes by identifying data nodes created for related pieces of data within the plurality of pieces of data identified by a relationship of the plurality of relationships;
for each set of related data nodes defined, creating a context node thereby creating a plurality of context nodes;
linking each of the plurality of context nodes to each of the related nodes in the set of related data nodes for which the context node was created;
creating a plurality of summary nodes, each summary node storing a unique type/value pair; and
linking each of the plurality of summary nodes to at least one of the plurality of context nodes, the at least one context node indicating a relationship exits between the summary node and the related nodes in the set of related data nodes for which the context node was created.

31. The method of claim 30, further comprising:
analyzing the plurality of data nodes as a first set of nodes of a bipartite graph and a union of the plurality of context nodes and the plurality of summary nodes as a second set of nodes of the bipartite graph.

32. The method of claim 30, further comprising:
creating a data node identifier for each data node;
for each data node, storing the data node identifier, type, and value of the data node in a record of a data layer table;
creating a context node identifier for each context node; and
for each link linking a context node to a data node, storing the context node identifier of the context node and the data node identifier of the data node in a record of a context layer table.

33. The method of claim 30, further comprising:
receiving a query definition; and
executing a query defined by the query definition thereby identifying a portion of the plurality of data nodes.

34. The method of claim 30, further comprising:
creating an index indexing at least a portion of the plurality of context nodes, the index being configured to facilitate traversal from the plurality of context nodes to the plurality of data nodes.

35. The method of claim 34, further comprising:
using the index to identify one or more context nodes linked to more than a threshold number of data nodes within the portion of the plurality of context nodes.

36. The method of claim 34, further comprising using the index to identify one or more context nodes linked to the largest number of data nodes within the portion of the plurality of context nodes.

37. The method of claim 30, further comprising:
creating an index indexing at least a portion of the plurality of context nodes, the index being configured to facilitate traversal from the plurality of data nodes to the plurality of context nodes.

38. The method of claim 37, further comprising using the index to identify one or more data nodes linked to more than a threshold number of context nodes.

39. The method of claim 37, further comprising using the index to identify one or more data nodes linked to the largest number of context nodes.

40. A method of constructing a data structure for storing data, the method comprising:
obtaining structured data comprising a plurality of pieces of data, each piece of data comprising a type and a value, the type and value together defining a type/value pair, the structured data further comprising a plurality of relationships between the ones of the plurality of pieces of data, each of the plurality of relationships identifying related pieces of data within the plurality of pieces of data;
identifying a portion of the plurality of pieces of data wherein each piece of data has a unique type/value pair within the plurality of pieces of data;
for each piece of data of the portion of the pieces of data identified, creating a data node thereby creating a plurality of data nodes;

defining a plurality of sets of related data nodes by identifying data nodes created for related pieces of data within the plurality of pieces of data identified by a relationship of the plurality of relationships;

for each set of related data nodes defined, creating a context node thereby creating a plurality of context nodes;

linking each of the plurality of context nodes to each of the related nodes in the set of related data nodes for which the context node was created; and for each type within the plurality of pieces of data determining whether the type is a bridge type, and if the type is a bridge type, identifying the data node as bridge type node.

41. The method of claim 40, further comprising:
traversing linked data nodes and context nodes; and
returning the type/value pair of any data nodes traversed that are not bridge type data nodes.

42. The method of claim 40, further comprising:
creating a data node identifier for each data node;
for each data node, storing the data node identifier, type, and value of the data node in a record of a data layer table;
creating a context node identifier for each context node; and
for each link linking a context node to a data node, storing the context node identifier of the context node and the data node identifier of the data node in a record of a context layer table.

43. The method of claim 40, further comprising:
receiving a query definition; and
executing a query defined by the query definition thereby identifying a portion of the plurality of data nodes.

44. The method of claim 40, further comprising:
creating an index indexing at least a portion of the plurality of context nodes, the index being configured to facilitate traversal from the plurality of context nodes to the plurality of data nodes.

45. The method of claim 44, further comprising:
using the index to identify one or more context nodes linked to more than a threshold number of data nodes within the portion of the plurality of context nodes.

46. The method of claim 44, further comprising using the index to identify one or more context nodes linked to the largest number of data nodes within the portion of the plurality of context nodes.

47. The method of claim 40, further comprising:
creating an index indexing at least a portion of the plurality of context nodes, the index being configured to facilitate traversal from the plurality of data nodes to the plurality of context nodes.

48. The method of claim 47, further comprising using the index to identify one or more data nodes linked to more than a threshold number of context nodes.

49. The method of claim 47, further comprising using the index to identify one or more data nodes linked to the largest number of context nodes.

50. A method of constructing a data structure for storing data, the method comprising:
obtaining structured data comprising a plurality of pieces of data, each piece of data comprising a type and a value, the type and value together defining a type/value pair, the structured data further comprising a plurality of relationships between the ones of the plurality of pieces of data, each of the plurality of relationships identifying related pieces of data within the plurality of pieces of data;

identifying a portion of the plurality of pieces of data wherein each piece of data has a unique type/value pair within the plurality of pieces of data;

for each piece of data of the portion of the pieces of data identified, creating a data node thereby creating a plurality of data nodes;

defining a plurality of sets of related data nodes by identifying data nodes created for related pieces of data within the plurality of pieces of data identified by a relationship of the plurality of relationships;

for each set of related data nodes defined, creating a context node thereby creating a plurality of context nodes; and linking each of the plurality of context nodes to each of the related nodes in the set of related data nodes for which the context node was created;

receiving a query definition;

executing a query defined by the query definition thereby identifying a portion of the plurality of data nodes; and if the values of at least two of the data nodes of the portion of the plurality of data nodes is numeric, performing a statistical analysis of the values of the at least two of the data nodes.

51. The method of claim 50, wherein performing the statistical analysis of the values of the at least two of the data nodes comprise one of:
totaling the values of the at least two of the data nodes,
averaging the values of the at least two of the data nodes,
determining a minimum value of the values of the at least two of the data nodes,
determining a maximum value of the values of the at least two of the data nodes,
determining a standard deviation value of the values of the at least two of the data nodes,
determining a median value of the values of the at least two of the data nodes, and
determining a mode value of the values of the at least two of the data nodes.

52. The method of claim 50, further comprising:
creating a data node identifier for each data node;
for each data node, storing the data node identifier, type, and value of the data node in a record of a data layer table;
creating a context node identifier for each context node; and
for each link linking a context node to a data node, storing the context node identifier of the context node and the data node identifier of the data node in a record of a context layer table.

53. The method of claim 50, further comprising:
creating an index indexing at least a portion of the plurality of context nodes, the index being configured to facilitate traversal from the plurality of context nodes to the plurality of data nodes.

54. The method of claim 53, further comprising:
using the index to identify one or more context nodes linked to more than a threshold number of data nodes within the portion of the plurality of context nodes.

55. The method of claim 53, further comprising using the index to identify one or more context nodes linked to the largest number of data nodes within the portion of the plurality of context nodes.

56. The method of claim 50, further comprising:
creating an index indexing at least a portion of the plurality of context nodes, the index being configured to facilitate traversal from the plurality of data nodes to the plurality of context nodes.

57. The method of claim 56, further comprising using the index to identify one or more data nodes linked to more than a threshold number of context nodes.

58. The method of claim 56, further comprising using the index to identify one or more data nodes linked to the largest number of context nodes.

59. A method of constructing a data structure for storing data, the method comprising:
- obtaining structured data comprising a plurality of pieces of data, each piece of data comprising a type and a value, the type and value together defining a type/value pair, the structured data further comprising a plurality of relationships between the ones of the plurality of pieces of data, each of the plurality of relationships identifying related pieces of data within the plurality of pieces of data;
- identifying a portion of the plurality of pieces of data wherein each piece of data has a unique type/value pair within the plurality of pieces of data;
- for each piece of data of the portion of the pieces of data identified, creating a data node thereby creating a plurality of data nodes;
- defining a plurality of sets of related data nodes by identifying data nodes created for related pieces of data within the plurality of pieces of data identified by a relationship of the plurality of relationships;
- for each set of related data nodes defined, creating a context node thereby creating a plurality of context nodes;
- linking each of the plurality of context nodes to each of the related nodes in the set of related data nodes for which the context node was created;
- receiving a query definition;
- executing a query defined by the query definition thereby identifying a portion of the plurality of data nodes; and
- using the type and value of the portion of the plurality of data nodes to construct a hypercube representation of the portion of the plurality of data nodes.

60. The method of claim 59, further comprising:
- creating a data node identifier for each data node;
- for each data node, storing the data node identifier, type, and value of the data node in a record of a data layer table;
- creating a context node identifier for each context node; and
- for each link linking a context node to a data node, storing the context node identifier of the context node and the data node identifier of the data node in a record of a context layer table.

61. The method of claim 59, further comprising:
- creating an index indexing at least a portion of the plurality of context nodes, the index being configured to facilitate traversal from the plurality of context nodes to the plurality of data nodes.

62. The method of claim 61, further comprising:
- using the index to identify one or more context nodes linked to more than a threshold number of data nodes within the portion of the plurality of context nodes.

63. The method of claim 61, further comprising using the index to identify one or more context nodes linked to the largest number of data nodes within the portion of the plurality of context nodes.

64. The method of claim 59, further comprising:
- creating an index indexing at least a portion of the plurality of context nodes, the index being configured to facilitate traversal from the plurality of data nodes to the plurality of context nodes.

65. The method of claim 64, further comprising using the index to identify one or more data nodes linked to more than a threshold number of context nodes.

66. The method of claim 64, further comprising using the index to identify one or more data nodes linked to the largest number of context nodes.

67. A method of constructing a data structure for storing data, the method comprising:
- obtaining structured data comprising a plurality of pieces of data, each piece of data comprising a type and a value, the type and value together defining a type/value pair, the structured data further comprising a plurality of relationships between the ones of the plurality of pieces of data, each of the plurality of relationships identifying related pieces of data within the plurality of pieces of data;
- identifying a portion of the plurality of pieces of data wherein each piece of data has a unique type/value pair within the plurality of pieces of data;
- for each piece of data of the portion of the pieces of data identified, creating a data node thereby creating a plurality of data nodes;
- defining a plurality of sets of related data nodes by identifying data nodes created for related pieces of data within the plurality of pieces of data identified by a relationship of the plurality of relationships;
- for each set of related data nodes defined, creating a context node thereby creating a plurality of context nodes;
- linking each of the plurality of context nodes to each of the related nodes in the set of related data nodes for which the context node was created;
- receiving a query definition from an entity, the query definition defining a query configured to be executed by traversal of the linked plurality of date nodes and plurality of context nodes, and during execution, to identify at least a portion of the plurality of data nodes,
- creating a data node for the entity,
- creating a data node for the query,
- creating a new context node,
- linking the new context node to both the data node for the entity and the data node for the query,
- executing the query to identify a portion of the plurality of data nodes, and
- linking the new context node to the portion of the plurality of data nodes identified by the query.

68. The method of claim 67, further comprising:
- repeating the method of claim 67 for a plurality of query definitions received from a plurality of entities;
- identifying at least a portion of the plurality of data nodes that were created for the plurality of entities, the data nodes identified defining a set of entity nodes,
- for each data node in the set of entity nodes, identifying at least one context node connected the data node,
- for the at least one context node identified for each data node in the set of entity nodes, identifying any data nodes other than the data nodes in the set of entity nodes connected to the at least one context node, the data nodes identified defining a result set of nodes associated with the data node in the set of entity nodes, and
- analyzing the result set of nodes associated with at least a portion of the data nodes in the set of entity nodes.

69. The method of claim 68, wherein analyzing the result set of nodes associated with at least the portion of the data nodes in the set of entity nodes comprises identifying one or more data nodes in the set of entity nodes associated with result sets of nodes including the same data node.

70. The method of claim 68, wherein analyzing the result set of nodes associated with at least the portion of the data nodes in the set of entity nodes comprises identifying a data node in the result set of nodes associated with at least a threshold number of data nodes in the set of entity nodes.

71. The method of claim 68, wherein analyzing the result set of nodes associated with at least the portion of the data nodes in the set of entity nodes comprises identifying one or more data nodes in the set of entity nodes associated with a particular data node in the result set of nodes.

72. The method of claim 67, further comprising:
creating a data node identifier for each data node;
for each data node, storing the data node identifier, type, and value of the data node in a record of a data layer table;
creating a context node identifier for each context node; and
for each link linking a context node to a data node, storing the context node identifier of the context node and the data node identifier of the data node in a record of a context layer table.

73. The method of claim 67, further comprising:
creating an index indexing at least a portion of the plurality of context nodes, the index being configured to facilitate traversal from the plurality of context nodes to the plurality of data nodes.

74. The method of claim 73, further comprising:
using the index to identify one or more context nodes linked to more than a threshold number of data nodes within the portion of the plurality of context nodes.

75. The method of claim 73, further comprising using the index to identify one or more context nodes linked to the largest number of data nodes within the portion of the plurality of context nodes.

76. The method of claim 67, further comprising:
creating an index indexing at least a portion of the plurality of context nodes, the index being configured to facilitate traversal from the plurality of data nodes to the plurality of context nodes.

77. The method of claim 76, further comprising using the index to identify one or more data nodes linked to more than a threshold number of context nodes.

78. The method of claim 76, further comprising using the index to identify one or more data nodes linked to the largest number of context nodes.

* * * * *